US012479211B2

(12) United States Patent
Zhao et al.

(10) Patent No.: US 12,479,211 B2
(45) Date of Patent: Nov. 25, 2025

(54) REMANUFACTURING METHOD OF INK CARTRIDGE, AND REMANUFACTURED INK CARTRIDGE

(71) Applicant: E-JET TECHNOLOGY CO., LTD., Zhuhai (CN)

(72) Inventors: Shengkui Zhao, Zhuhai (CN); Dongming Lin, Zhuhai (CN)

(73) Assignee: E-JET TECHNOLOGY CO., LTD., Zhuhai (CN)

(*) Notice: Subject to any disclaimer, the term of this patent is extended or adjusted under 35 U.S.C. 154(b) by 0 days.

(21) Appl. No.: 18/490,320

(22) Filed: Oct. 19, 2023

(65) Prior Publication Data

US 2024/0066883 A1 Feb. 29, 2024

Related U.S. Application Data

(63) Continuation of application No. 17/589,134, filed on Jan. 31, 2022, now Pat. No. 11,827,027, which is a (Continued)

(30) Foreign Application Priority Data

Mar. 4, 2019 (CN) ......................... 201920268295.9
Apr. 12, 2019 (CN) ......................... 201920517463.3
(Continued)

(51) Int. Cl.
*B41J 2/175* (2006.01)

(52) U.S. Cl.
CPC ....... *B41J 2/17559* (2013.01); *B41J 2/17503* (2013.01); *B41J 2/1752* (2013.01); *B41J 2/17523* (2013.01)

(58) Field of Classification Search
CPC .... B41J 2/175; B41J 2/17503; B41J 2/17506; B41J 2/17509; B41J 2/17513;
(Continued)

(56) References Cited

U.S. PATENT DOCUMENTS 6,206,514 B1 * 3/2001 Tajima ................. B41J 2/17556 347/86
6,559,973 B2 * 5/2003 Bullock ............... B41J 2/17546 358/1.6
(Continued)

FOREIGN PATENT DOCUMENTS

CN 1223933 A 7/1999
CN 102514381 A 6/2012
(Continued)

OTHER PUBLICATIONS

World Intellectual Property Organization (WIPO) International Search Report for PCT/CN2019/083046 Nov. 15, 2019 5 Pages.

*Primary Examiner* — Anh T Vo

(74) *Attorney, Agent, or Firm* — ANOVA LAW GROUP, PLLC

(57) ABSTRACT

A remanufactured ink cartridge includes a case, an ink discharge opening, and an external body. The case is configured to store ink. The ink discharge opening is arranged at the case and configured to supply the ink to outside. The external body fluid-communicates with the case.

19 Claims, 13 Drawing Sheets

Related U.S. Application Data continuation-in-part of application No. 16/809,503, filed on Mar. 4, 2020, now Pat. No. 11,267,251, which is a continuation of application No. PCT/CN2019/083046, filed on Apr. 17, 2019.

(30) Foreign Application Priority Data

Feb. 28, 2020 (CN) ......................... 202010131544.7
May 12, 2021 (CN) ......................... 202121017729.1

(58) Field of Classification Search
CPC .... B41J 2/1752; B41J 2/17523; B41J 2/1753; B41J 2/17546; B41J 2/17553
See application file for complete search history.

(56) References Cited

U.S. PATENT DOCUMENTS

| | | | | |
|---|---|---|---|---|
| 7,434,931 | B2 * | 10/2008 | Warden .................. | G02C 7/027 351/204 |
| 8,066,360 | B2 * | 11/2011 | Myers .................. | B41J 2/17523 347/86 |
| 8,287,108 | B2 | 10/2012 | Uehara et al. | |
| 8,733,914 | B2 | 5/2014 | Ishizawa et al. | |
| 2006/0132553 | A1 * | 6/2006 | Droege ................ | B41J 2/17513 347/84 |
| 2006/0290722 | A1 | 12/2006 | Kitagawa et al. | |
| 2011/0316907 | A1 † | 12/2011 | Huang | |

FOREIGN PATENT DOCUMENTS

| | | | |
|---|---|---|---|
| CN | 204196454 | U | 3/2015 |
| CN | 204222389 | U | 3/2015 |
| CN | 207224847 | U | 4/2018 |
| CN | 109572224 | A | 4/2019 |
| CN | 109572225 | A | 4/2019 |
| CN | 109720100 | A | 5/2019 |
| CN | 109733073 | A | 5/2019 |
| CN | 211641449 | † | 10/2020 |
| CN | 112590398 | † | 4/2021 |
| JP | 2001353878 | A | 12/2001 |
| JP | 2007223117 | A | 9/2007 |

* cited by examiner
† cited by third party

REMANUFACTURING METHOD OF INK CARTRIDGE, AND REMANUFACTURED INK CARTRIDGE

CROSS-REFERENCE TO RELATED APPLICATION

This application is a continuation application of U.S. patent application Ser. No. 17/589,134, filed on Jan. 31, 2022, which is a continuation in-part application of U.S. patent application Ser. No. 16/809,503, filed on Mar. 4, 2020, which claims the priority to Chinese Patent Application No. 202010131544.7, filed on Feb. 28, 2020, and is a continuation application of International Application No. PCT/CN2019/083046, filed on Apr. 17, 2019, which claims the priority to Chinese Patent Application No. 201920517463.3, filed on Apr. 12, 2019. Each of the above enumerated patent applications further claims the priority to Chinese Patent Application No. 201920268295.9, filed on Mar. 4, 2019. This application further claims the priority to Chinese Patent Application No. 202121017729.1, filed on May 12, 2021. All of the above enumerated patent applications are incorporated herein by their reference.

TECHNICAL FIELD

The present disclosure generally relates to the field of inkjet image formation and, more particularly, relates to a remanufacturing method of an ink cartridge, and a remanufactured ink cartridge.

BACKGROUND

In the field of inkjet image formation, ink cartridges are consumables for inkjet printers. When the ink in an ink cartridge is completely consumed, an end user needs to replace the empty ink cartridge with a new ink cartridge. From the perspective of environmental protection, it is preferable to remanufacture the empty housing of the ink cartridge that the ink is completely consumed.

Normally, an ink cartridge type is suitable for an inkjet printer type, that is, an inkjet printer model corresponds to an applicable ink cartridge model. In actual situations, appearances of two types of ink cartridges may be similar, where there are more empty housings of the first type and less empty housings of the second type, but there is more demand for the second type of ink cartridges.

SUMMARY

One aspect of the present disclosure provides a remanufactured ink cartridge, including a case, an ink discharge opening, and an external body. The case is configured to store ink. The ink discharge opening is arranged at the case and configured to supply the ink to outside. The external body is connected to the case and forms a fluid connection with the case.

Another aspect of the present disclosure provides a method for remanufacturing a target ink cartridge. The target ink cartridge includes a case configured to store ink and an ink discharge opening arranged at the ink discharge opening and configured to supply the ink to outside. The method includes remanufacturing the case and connecting an external body to the case to form a fluid connection between the external body and the case.

The remanufactured ink cartridge may use its own gravity or a protrusion located therein to be in contact with the inner wall of the printer to realize the positioning of the remanufactured ink cartridge in the inkjet printer; or an engagement part with an engagement surface is disposed on the remanufactured ink cartridge, and the engagement surface is used to engage the corresponding position of the inkjet printer to realize the positioning of the remanufactured ink cartridge in the inkjet printer.

When the remanufactured ink cartridge has the engagement part, the engagement part may be new or old, as long as the relative position of the engagement surface and the ink discharge part in the remanufactured ink cartridge meets the requirements.

Furthermore, the remanufactured ink cartridge may also be disposed with an external body combined with the cavity, and whether the external body needs to be filled with ink may be determined according to the model requirements of the remanufactured ink cartridge; when the new engagement part is disposed in the remanufactured ink cartridge, the new engagement part and the external body are formed integrally, which is beneficial for reducing the assembly process; obviously, the remanufactured ink cartridge may also be disposed with the old engagement part and the external body is not connected with the old engagement part.

However, regardless of whether the engagement part in the remanufactured ink cartridge is new or old, a connecting plate may be disposed above the upper side surface of the case. On the one hand, the connecting plate serves to connect the main body of the external body and the new engagement part; and on the other hand, it also serves to increase the height of the remanufactured ink cartridge.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1A:
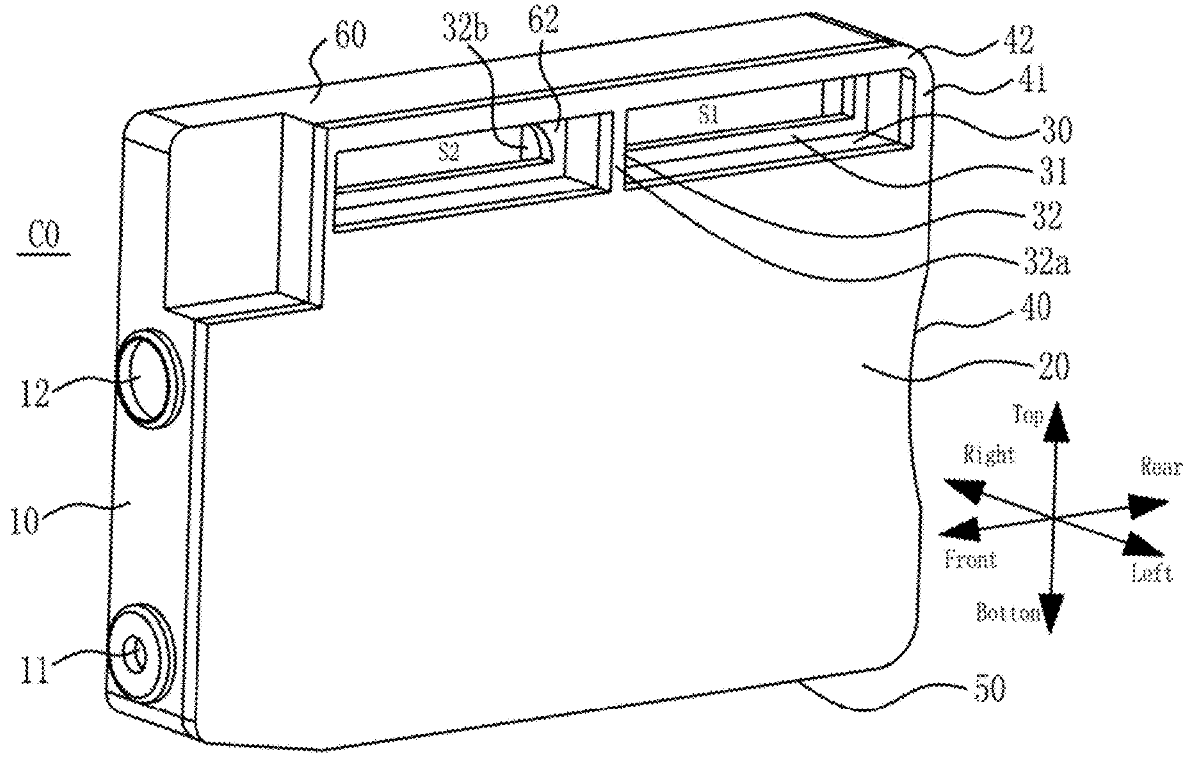
FIGS. 1A-1B illustrate stereoscopic views of a low-capacity-type ink cartridge before modification according to the first embodiment of the present disclosure.

Embodiments of the present disclosure are described in detail with reference to the drawings hereinafter. The empty housing of a low-capacity ink cartridge, used to remanufacture a high-capacity ink cartridge (a target ink cartridge) from a low-capacity ink cartridge, may be an empty housing of an ink cartridge, where the ink has been consumed completely, obtained by recycling, or may be a new empty housing of an ink cartridge obtained by an injection molding manner. However, the methods described in the present disclosure may be used to obtain the high-capacity ink cartridge by remanufacturing the low-capacity ink cartridge regardless of the method used to obtain the empty housing of the low-capacity ink cartridge. The ink cartridge remanufactured from the low-capacity ink cartridge may at least be same as the high-capacity ink cartridge in external dimensions. The volume of the ink cartridge remanufactured from the low-capacity ink cartridge may be same as or different from the volume of the high-capacity ink cartridge, which may be described hereinafter.

According to the method described below, an empty housing of the low-capacity ink cartridge may need to be modified first, and then the modified empty housing of the low-capacity ink cartridge may be combined with an external body. In order to better describe the ink cartridge, the definitions are the following: an empty housing of the low-capacity ink cartridge before modification is C0, an empty housing of the low-capacity ink cartridge after modification is C1, an external body is C2, and a remanufactured ink cartridge is C.

In an implementation, if the empty housing of the ink cartridge is obtained by injection molding, the empty housing C0 of the low-capacity ink cartridge before modification may be directly injection molded; or the empty housing C1 of the low-capacity ink cartridge after modification may also be directly injection molded to simplify process steps and process costs.

Practically, manufacturers for producing compatibility or remanufactured ink cartridges may obtain a relatively large quantity of used empty housings of the low-capacity ink cartridges. A used empty housing of the low-capacity ink cartridge may be referred to the empty housing C0 of the low-capacity ink cartridge before modification, and the empty housing of the ink cartridge may be referred to as the ink cartridge for simplicity hereinafter.

The method for remanufacturing the low-capacity ink cartridge C0 according to the present disclosure may be connecting the external body C2 (described below) to the modified ink cartridge C1, such that the remanufactured ink cartridge C may be the same as the high-capacity ink cartridge in external dimensions. According to the needs of end users, when the external body C2 contains ink, the volume of the ink cartridge may be the same as the volume of the high-capacity ink cartridge; when the external body C2 does not contain ink, the volume of the ink cartridge may be the same as the volume of the low-capacity ink cartridge. Furthermore, the external body C2 may be regarded as a holding portion, and an end user may operate the ink cartridge C by holding the external body C2 without concerning the ink leakage from the external body C2. The ink contained in the external body C2 may be used as an example for description hereinafter.

Embodiment 1

Structure of the Ink Cartridge Before Modification

Figure 1B:
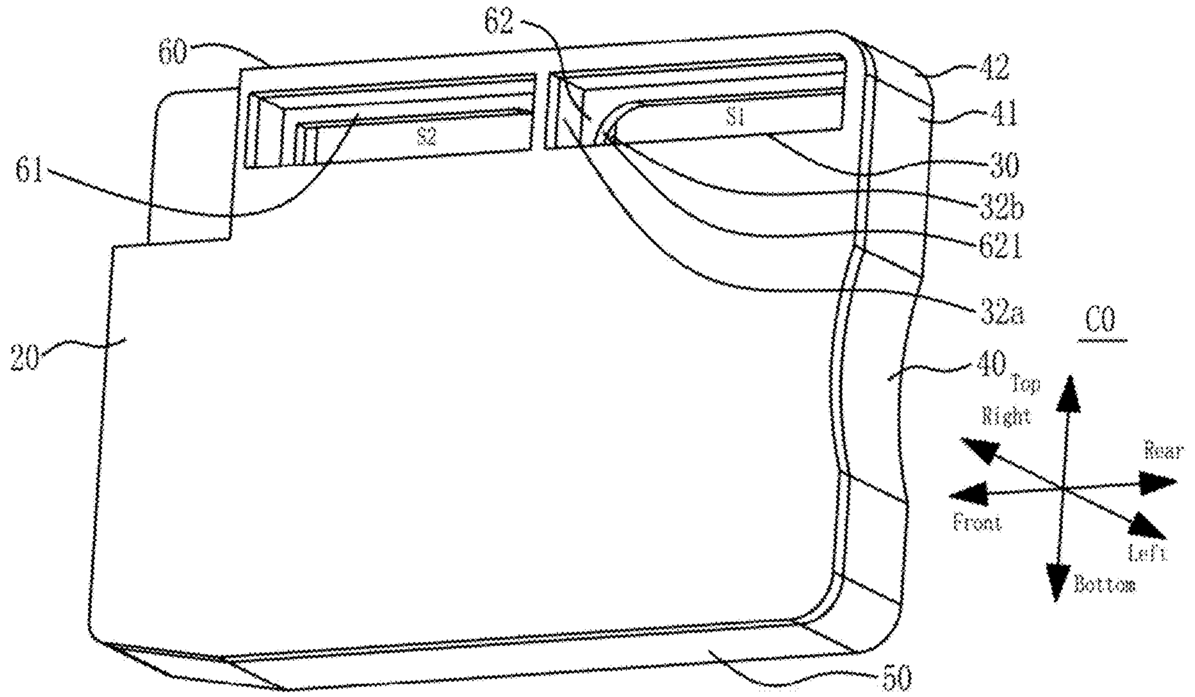

FIGS. 1A-1B illustrate stereoscopic views of a low-capacity-type ink cartridge before modification according to the first embodiment of the present disclosure. As shown in FIGS. 1A-1B, the ink cartridge C0 before the modification may have a regular polyhedron as a whole; a plurality of plates of the polyhedron may be enclosed to form a cavity for containing ink; and an ink outlet 11 for connecting to an inkjet printer and a gas inlet 12 for air exchange with the outside may be disposed at the ink cartridge C0. Based on the state of the ink cartridge C0 after being installed, a side where the ink outlet 11 is located is defined as a front side, a side opposite to the front is defined as a rear side, where the ink cartridge C0 may be installed forward along the front-rear direction; when viewing from the rear side to the front side, a left side of the line of sight is defined as a left side, a right side of the line of sight is defined as a right side, a upper side of the sight line is defined as a top side, and a lower side of the sight line is defined as a bottom side.

The ink cartridge C0 may include a front side plate 10 at the front side, a rear side plate 40 at the rear side, a top side plate 30 at the top side, side plates 20 at the left and right sides, and a bottom side plate 50 at the bottom side. In one embodiment, the ink outlet 11 and the gas inlet 12 may both be disposed at the front side plate 10. Furthermore, the ink cartridge C0 may further include a top plate 60 disposed above the top side plate 30, an accommodation space for accommodating fingers may be formed between the top plate 60 and the top side plate 30. In other embodiments, the ink outlet may be disposed at a bottom side plate.

As shown in FIG. 1A, along the up-down direction of the ink cartridge C0, a closing plate 41 may be formed by extending the rear side plate 40 upwardly, and the closing plate 41 may be connected to the top plate 60 through an arc portion 42. Therefore, the accommodation space may be closed along the front-rear diction of the ink cartridge C0. Furthermore, the ink cartridge C0 may further include a first supporting plate 32 between the top plate 60 and the top side plate 30, thereby improving the strength of the top plate 60. In addition, referring to FIGS. 1A-1B, a lower rib 31 may be formed by protruding upwardly from the top side plate 30, and an upper rib 61 may be formed by protruding downwardly from the top plate 60, which is opposite to the lower rib 31. The upper rib 61 and the lower rib 30 may extend along the front-rear direction of the ink cartridge C0.

Meanwhile, the ink cartridge C0 may further include a second supporting plate 62 between the upper rib 61 and the lower rib 31. The first supporting plate 32 may intersect the second supporting plate 62. Along the front-rear direction, the second supporting plate 62 may divide the accommodation space into a first space S1 and a second space S2, and the first space S1 may be located behind the second space S2, that is, the first space S1 may be more adjacent to the closing plate 41. Along the left-right direction, the second supporting plate 62 may divide the first supporting plate 32 into a left supporting plate 32*a* and a right supporting plate 32*b*. When an operator holds the ink cartridge C0, even if fingers of the operator slip, the arrangement of the left supporting plate 32*a* and the right supporting plate 32*b* may increase the friction force and also prevent the fingers from sliding further. Obviously, even if the second supporting plate 62 is not disposed, the first supporting plate 32 may still be divided into the left supporting plate 32*a* and the right supporting plate 32*b* using the upper rib 61 or the lower rib 31 as the boundary. Optionally, along the front-rear direction of the ink cartridge C0, at least a side surface 621 of the second supporting plate 62 facing the first space S1 may be a curved surface, which may be compatible to the finger shape and improve the experience of the operator.

Modification Method of the Ink Cartridge

Figure 2A:
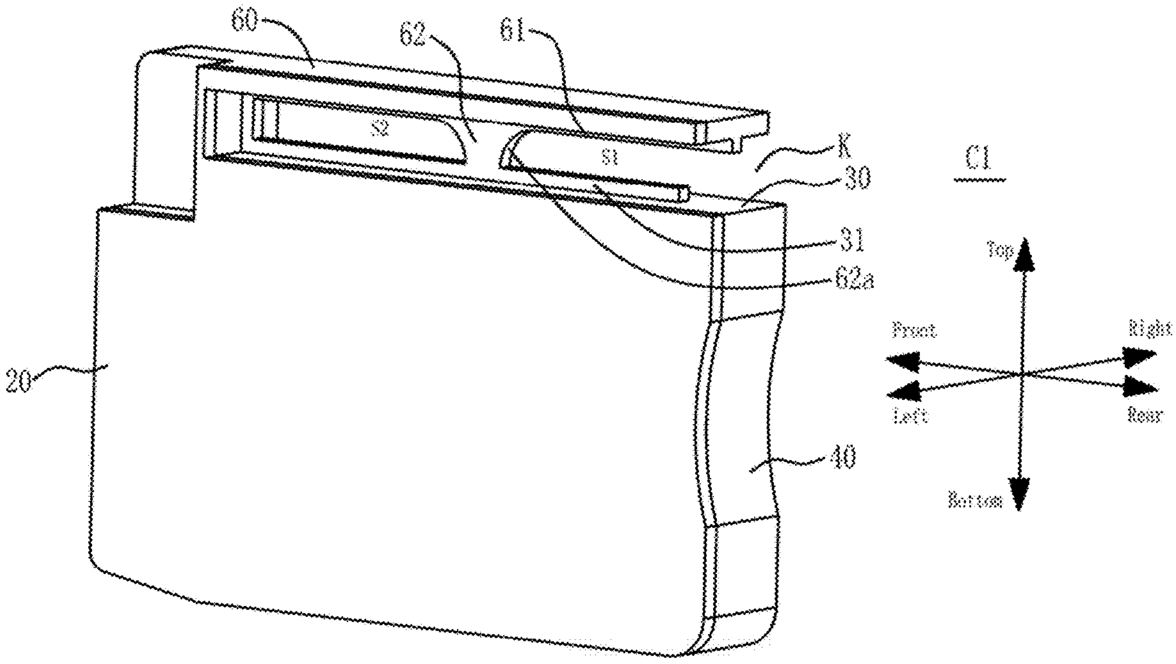
FIG. 2A illustrates a stereoscopic view of a low-capacity-type ink cartridge with a portion being cut off according to the first embodiment of the present disclosure.
Figure 2B:
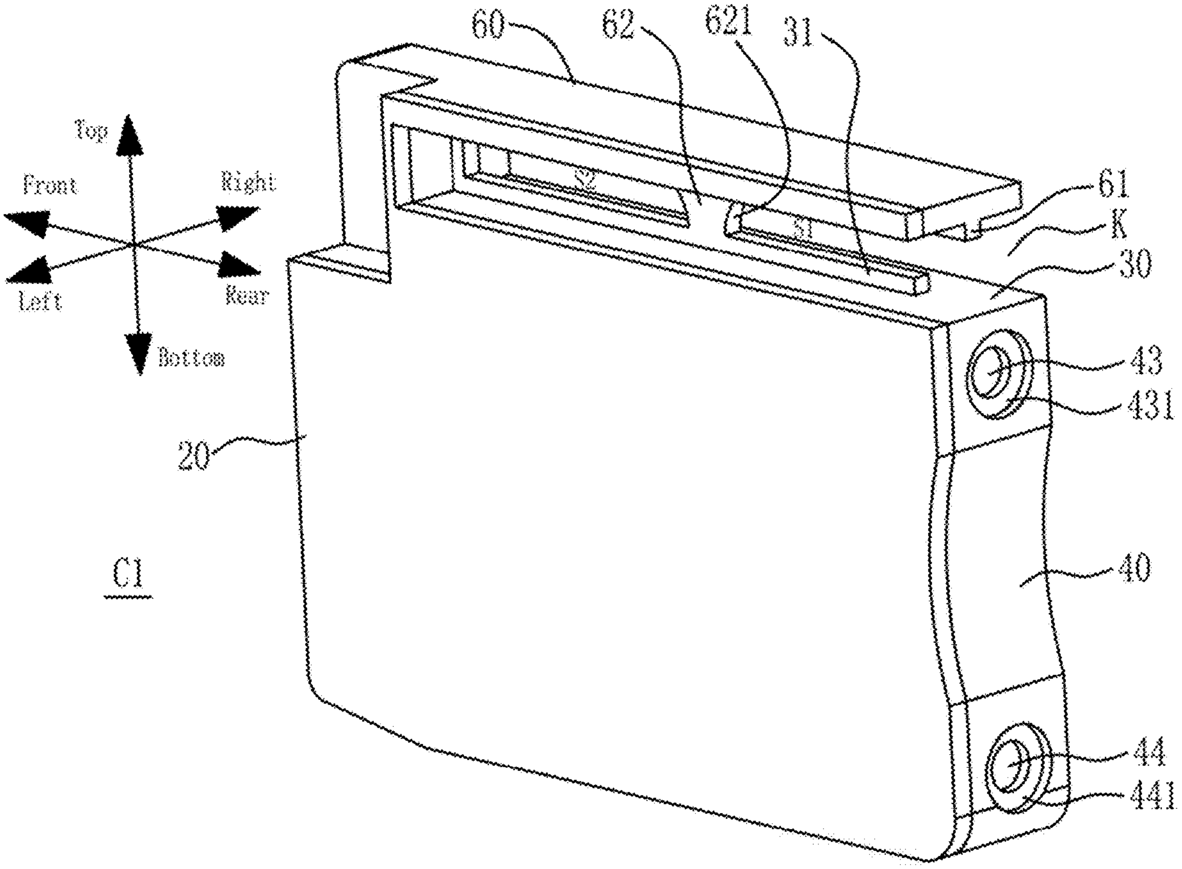
FIG. 2B illustrates a stereoscopic view of a low-capacity-type ink cartridge after modification according to the first embodiment of the present disclosure.

The modification method of the ink cartridge C0 is described with reference to FIGS. 2A-2B hereinafter. FIG. 2A illustrates a stereoscopic view of a low-capacity-type ink cartridge with a portion being removed according to the first embodiment of the present disclosure. FIG. 2B illustrates a stereoscopic view of a low-capacity-type ink cartridge after modification according to the first embodiment of the present disclosure.

When the modified ink cartridge C1 is combined with the external body C2, the cavity of the ink cartridge C1 may be connected to the cavity of the external body C2. Therefore, the air in the cavity of the ink cartridge C1 may be exchanged with the ink in the cavity of the external body C2, and the ink in the cavity of the external body C2 may be refilled into the cavity of the ink cartridge C1, thereby achieving the purpose of expanding the capacity of the ink cartridge C1. Meanwhile, external dimensions of the ink cartridge C formed by combining the ink cartridge C1 with the external body C2 may be the same as the external dimensions of a high-capacity ink cartridge. In such way, the ink cartridge C and the high-capacity ink cartridge may be used interchangeably.

For example, a connecting part, a gas outlet 43, and an ink inlet 44 may need to be disposed at the ink cartridge C0/C1, and a connected part, a gas inflow tube 88, and an ink outflow tube 89 may need to be disposed at the external body C2. Through the combination of the connecting part and the connected part, the combination of the gas outlet 43 and the gas inflow tube 88, and the combination of the ink inlet 44 and the ink outflow tube 89, the ink cartridge C1 and the external body C2 may be combined into the modified ink cartridge C described in the following description.

As shown in FIG. 2A, the closing plate 41 may be cut off to form an opening K at the first space S1 along the front-rear direction, and an arc side surface 621 may face the opening K. Furthermore, the arc portion 42 may also be cut off to enlarge the opening K, which may be more advantageous for combining with the external body C2 described below. Furthermore, a portion of the upper rib 61 or a portion of the lower rib 31 may also be cut off to make the lengths of the upper rib 61 and the lower rib 31 to be different along the front-rear direction, the beneficial effects thereof may be described below.

Meanwhile, the left supporting plate 32*a* and the right supporting plate 32*b* of the ink cartridge may also be cut off. As shown in FIG. 2A, the upper rib 61 and the lower rib 31 may be supported by the second supporting plate 62. Although the closing plate 41 and the arc portion 42 at the rear side are cut off, the opening K is formed between the top plate 60 and the top side plate 30, and the top plate 60 adjacent to the opening K may no longer be supported; however, the second supporting plate 62 may support the top plate 60, thereby ensuring the strength of the top plate 60 and the ink cartridge C1.

As shown in FIG. 2B, at least one of the gas outlet 43 and the ink inlet 44 may be disposed at the side where the ink outlet 11 is not disposed, that is, both the gas outlet 43 and the ink inlet 44 may not be disposed at a same side plate as the ink outlet 11. Optionally, the gas outlet 43 and the ink inlet 44 may be disposed at a same side plate. Optionally, the gas outlet 43 and the ink inlet 44 may be disposed at the rear side plate 40, and the gas outlet 43 may be between the opening K and the ink inlet 44 along the up-down direction, such that the opening direction of the opening K may be the same as the opening direction of the gas outlet 43 and the opening direction of the ink inlet 44, which may not be limited according to the embodiments of the present disclosure. The gas outlet 43 and the ink inlet 44, used for communicating the fluid communication openings of the cavity of the ink cartridge C1 and the cavity of the external body C2, may be disposed at any side plate other than the side plate having the ink outlet 11. When the ink cartridge C1 and the external body C2 perform air and liquid exchange, disposing the gas outlet 43 and the ink inlet 44 away from the ink outlet 11 may facilitate the pressure change reduction adjacent to the ink outlet 11, thereby avoiding possible image forming defects caused by the pressure change.

The gas outlet 43 and the ink inlet 44 may both be set in a step shape, that is, a stepped surface 431 may be formed between the gas outlet 43 and the rear side plate 40, and a stepped surface 441 may also be formed between the ink inlet 44 and the rear side plate 40. The gas outlet 43 may be used to allow the air entering the cavity of the ink cartridge C1 through the gas inlet 12 to flow out to the external body C2, and the ink inlet 44 may be used to allow the ink in the external body C2 to flow into the cavity of the ink cartridge C1 after the air enters the cavity of the external body C1 from the cavity of the ink cartridge C1.

External Body

Figure 3A:
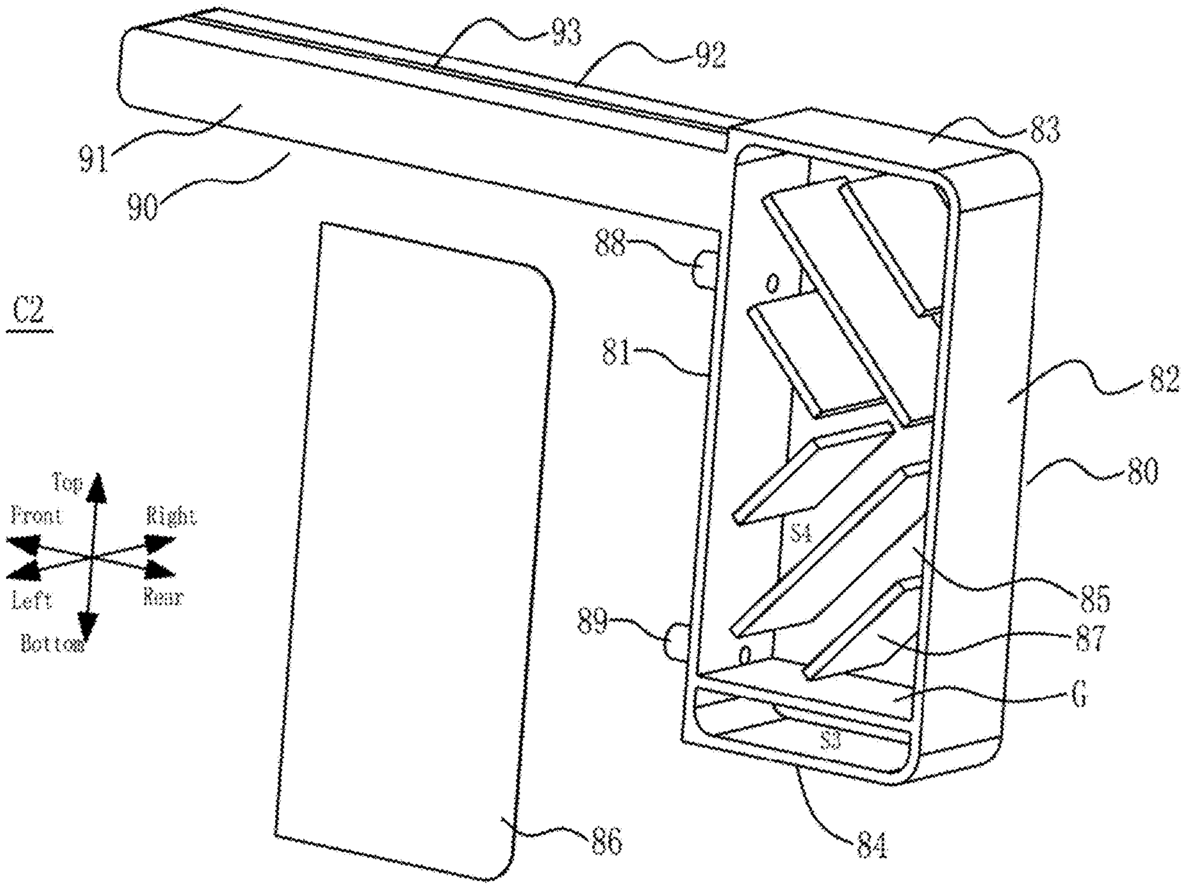
FIGS. 3A-3B illustrate stereoscopic views of an external body according to the first embodiment of the present disclosure.
Figure 3B:
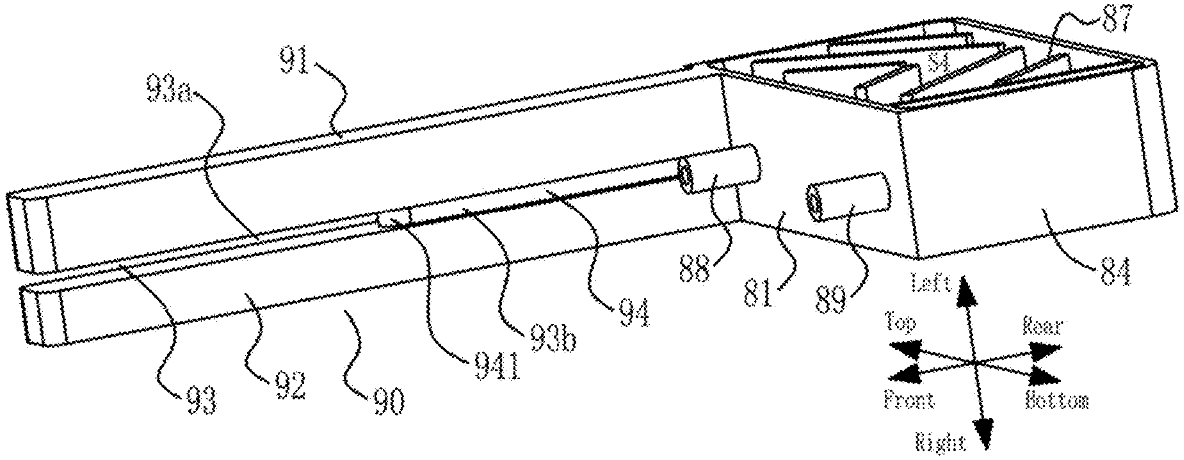

FIGS. 3A-3B illustrate stereoscopic views of an external body according to the first embodiment of the present disclosure.

As shown in FIGS. 3A-3B, the external body C2 may include an external member 80 and a connected part 90 which is connected to the external member 80. Ink may be contained in the external member 80, and the connected part 90 may be used to be connected to a connecting part disposed at the ink cartridge C1.

Similar to the ink cartridge C0 and the ink cartridge C1, the external body C2 may also have front, rear, top, bottom, left and right sides. The connected part 90 may protrude from a front side plate 81 of the external member 80. Along the up-down direction, the external member 80 may have same dimensions as the ink cartridge C0 and the in cartridge C1, such that the remanufactured ink cartridge C may be have a flat surface along the up-down direction (shown in FIG. 5).

The external member 80 may include a front side plate 81, a rear side plate 82, an top side plate 83, a bottom side plate 84, a right side plate 85, and a covering part 86. The front side plate 81, the rear side plate 82, the top side plate 83, the bottom side plate 84, the right side plate 85 may be enclosed to form an ink storage space S4 with an opening on one side, and the covering part 86 may cover the opening, such that the ink storage space S4 may be sealed. The covering part 86 may be made of a transparent material, such as a transparent PP film, such that an operator may observe whether the ink storage space S4 has ink in the ink storage space S4 from the outside of the covering part 86.

As described above, the connected part 90 may protrude forward from the front side plate 81, and the external member 80 may further include the gas inflow tube 88, and the ink outflow tube 89 which are disposed at the front side plate 81. The gas inflow tube 88 may be used to be combined with the gat outlet 43 disposed at the ink cartridge C1, and the ink outflow tube 89 may be used to be combined with the ink inlet 44 disposed at the ink cartridge C1. The gas inflow tube 88, and the ink outflow tube 89 may protrude from the front side plate 81. Similarly, along the up-down direction, the gas inflow tube 88 may be between the ink outflow tube 89 and the connected part 90.

Optionally, the ink inlet 44 and the ink outflow tube 89 may be disposed as adjacent as possible to the bottom side plate 50 of the ink cartridge C1 and the bottom side plate 84 of the external member 80. However, considering the actual shape of the ink cartridge C1, a certain distance may be between the ink inlet 44 and the bottom side plate 50 along the up-down direction, such that a certain distance may be between the ink outflow tube 89 and the bottom side plate 84. As shown in FIG. 3A, the external member 80 may further include a separation plate G, which may separate an accommodation cavity S3 from the ink storage space S4. The ink outflow tube 89 may be disposed adjacent to the separation plate G, which may ensure that the ink stored in the ink storage space S4 may be consumed completely without being wasted.

Obviously, the separation plate G may be not necessary. For example, the dimension of the external member 80 may be less than the dimension of the ink cartridge C1 along the up-down direction, and the dimension difference between the external member 80 and the ink cartridge C1 may be the dimension of the accommodation cavity S3 along the up-down direction. Furthermore, the external member 80 may also include a deflector 87 in the ink storage space S4. Optionally, the deflector 87 may be a plate protruding from the right side plate 85 toward the ink storage space S4. The deflector 87 may be inclined toward the ink outflow tube 89 and may not be in contact with other parts of the external member 80. In such way, the ink flow efficiency in the ink storage space S4 may be effectively improved, and the resistance from the deflector 87 may be significantly reduced when the fluid (air and ink) in the ink storage space S4 flows.

As shown in FIG. 3B, the connected part 90 may include a first connecting rod 91 and a second connecting rod 92 which may extend forward from the front side plate 81. The first connecting rod 91 and the second connecting rod 92 may be parallel to each other and may form a clamping space 93. When the connected part 90 is combined with the ink cartridge C1 along the front-rear direction, at least one of the upper rib 61 and the lower rib 31 may enter the clamping space 93; the first connecting rod 91 and the second connecting rod 92 may be restricted by the top plate 60 and the top side plate 30 along the up-down direction; the first connecting rod 91 and the second connecting rod 92 may be restricted by at least one of the upper rib 61 and the lower rib 31 along the left-right direction; and finally, the position of the external body C2 relative to the ink cartridge C1 may be determined.

The lengths of the upper rib 61 and the lower rib 31 along the front-rear direction may be different, as described above. That is, along the front-rear direction, the upper rib 61 may be longer than the lower rib 31, or the lower rib 31 may be longer than the upper rib 61. No matter which of the two ribs is longer, the shorter rib may provide a space for the connected part 90 to swing along the left-right direction when the connected part 90 is combined with the ink cartridge C1, such that the combination of the external body C2 and the ink cartridge C1 may be more efficient. As a modification manner, the lengths of the upper rib 61 and the lower rib 31 along the front-rear direction may be set to be same, but the lengths of the first connecting rod 91 and the second connecting rod 92 may be set to be different, which may achieve the same effect. Furthermore, the lengths of the upper rib 61 and the lower rib 31 along the front-rear direction may be set to be different, and also the lengths of the first connecting rod 91 and the second connecting rod 92 may be set to be different, such that the installation of the connected part 90 may be smoother.

As described above, a connecting part capable of being combined with the connected part 90 may need to be disposed at the ink cartridge C1. For example, in one embodiment, the connecting part may include at least one of the top plate 60, the top side plate 30, the upper rib 61 and the lower rib 31, where the top plate 60 and the top side plate 30 may restrict the connected part 90 along the up-down direction and at least one of the upper rib 61 and the lower rib 31 may restrict the connected part 90 along the left-right direction. That is, when the external body C2 is combined with the ink cartridge C1 along the front-rear direction, the connecting part may include a part capable of restricting the connected part 90 along the up-down direction and the left-right direction. The connecting part may include a part capable of spatially restricting the connected part 90 along a direction perpendicular to a direction of combining the external body C2 with the ink cartridge C1.

Although the top side plate 30 is a portion for forming the cavity of the ink cartridge C1, if only the structure of the connecting part is considered, the top side plate 30 may be peeled from the part forming the cavity of the ink cartridge C1. In such way, the connecting part may be described as the following: the connecting part may include the top plate (upper restricting part) 60 for restricting the connected part 90 from the top side, the top side plate (lower restricting part) 30 for restricting the connected part 90 from the bottom side, and at least one of the upper rib 61 and the lower rib 31 for restricting the connected part 90 from the left and right sides. The upper rib 61 and the lower rib 31 may respectively protrude from the upper restricting part 60 and the lower restricting part 30 along the up-down direction. In one embodiment, the connecting part may be disposed above the cavity of the ink cartridge C1. However, the connecting part may also be disposed at other positions of the ink cartridge C1. For example, the connecting part may be disposed at the left, right, and bottom sides of the ink cartridge C1, as long as the combination with the connected part 90 may be implemented.

As described above, the second supporting plate 62 may be still left between the upper rib 61 and the lower rib 31 in the modified ink cartridge C1. When the connecting part is combined with the connected part 90, the second supporting plate 62 may enter the clamping space 93 by following the upper rib 61 and the lower rib 31. In order to further enhance the strength of the ink cartridge C, as shown in FIGS. 3A-3B, a supporting element 94 may also be disposed in the clamping space 93. When the connecting part is combined with the connected part 90, at least a portion of the upper rib 61 and the lower rib 31 may be supported by the supporting element 94, the possible shaking, along the up-down direction, of the upper rib 61, especially the top plate 60, may be stopped by the supporting element 94.

Along the up-down direction, the dimension of the supporting element 94 may be less than the dimension of the clamping space 93, and the supporting element 94 may either extend forward from the front side plate 81 or be formed only in the clamping space 93 without contacting the front side plate 83; when the supporting element 94 is formed by the latter manner, the supporting element 94 may also be formed separately from the connecting rod, that is, the supporting element 94 may be an independent part which is externally mounted to the clamping space 93. The clamping space 93 may be separated to form a front clamping portion 93*a* and a rear clamping portion 93*b* along the front-rear direction. Optionally, the dimensions, along the front-rear direction, of the front clamping portion 93*a* and the rear clamping portion 93*b* may be substantially same as the dimension of the second space S2 and the dimension of the first space S1, respectively. The dimension of the supporting platform 94 and the dimension of the first space S1 may be substantially same along the up-down direction. When the connecting part is combined with the connected part 90, a portion of the first connecting rod 91 and the second connecting rod 92 corresponding to the front clamping portion 93*a* may be corresponding to the second space S2, and the supporting platform 94 may be corresponding to the first space S1 and substantially fill the first space S1.

Optionally, as shown in FIG. 3B, the front end of the supporting element 94 may be disposed with a mating surface 941 which may mate the side surface 621 of the second supporting plate. In such way, the combination between the connecting part and the connected part 90 may be more tight and the remanufactured ink cartridge C may have a better overall strength.

The above-mentioned description is based on the example where the connecting part is disposed in the ink cartridge C1 and the connected part 90 is disposed in the external body C2. It should be understood that the positions of the connecting part and the connected part 90 may be exchanged, that is, the connecting part is disposed in the external body C2 and the connected part 90 is disposed in the ink cartridge C1.

Combination of the External Body and the Remanufactured Ink Cartridge

Figure 4:
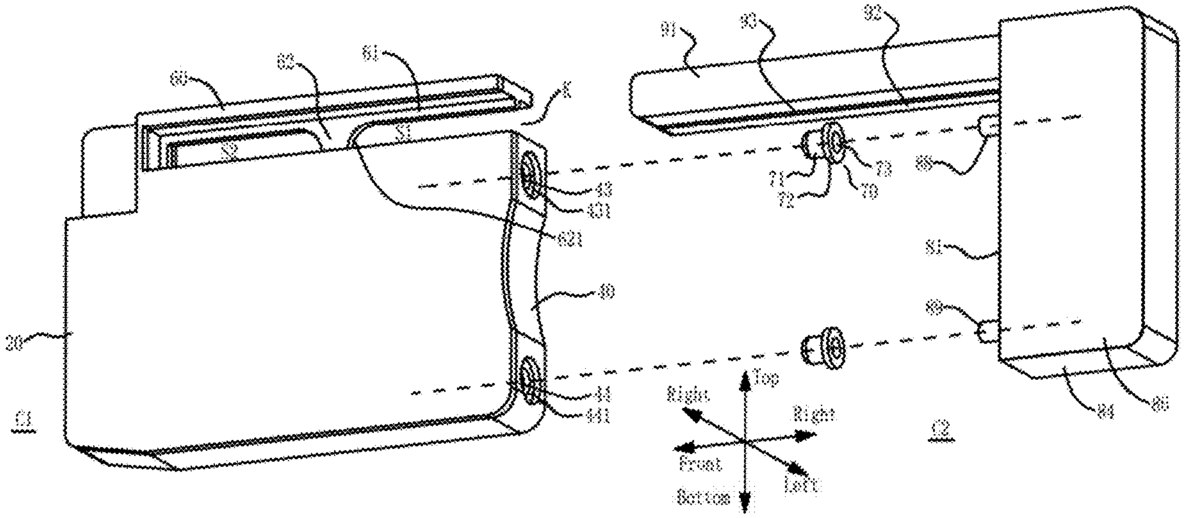
FIG. 4 illustrates a state schematic before the combination of a low-capacity-type ink cartridge after modification and an external body according to the first embodiment of the present disclosure.
Figure 5:
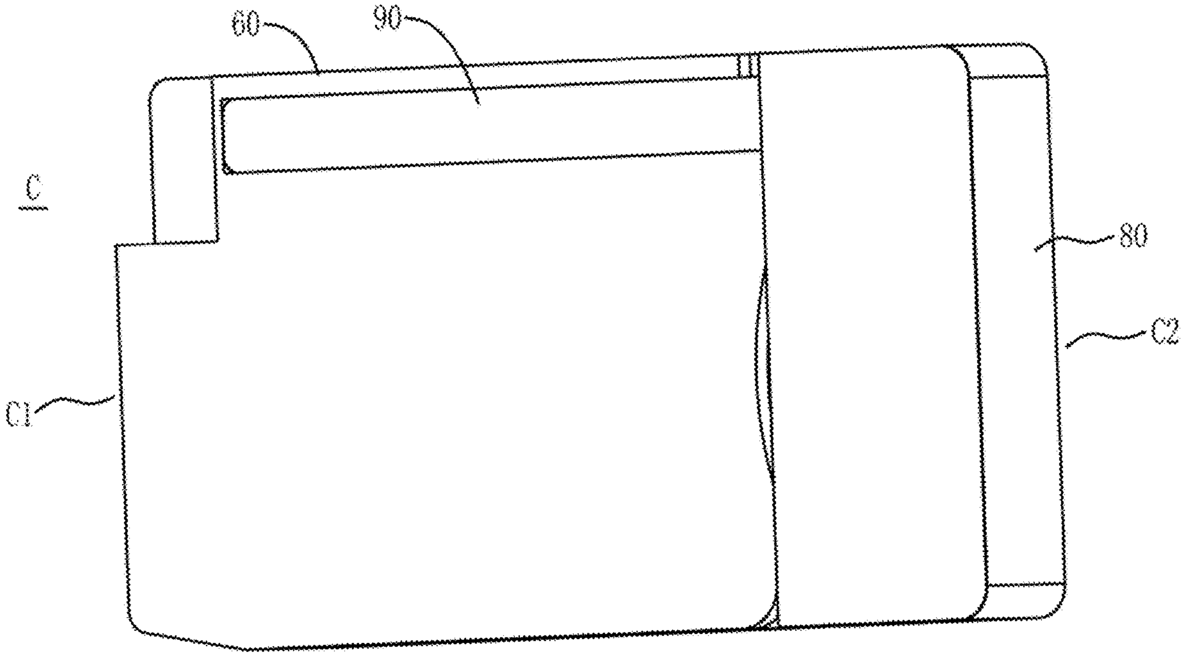
FIG. 5 illustrates a state schematic after the combination of a low-capacity-type ink cartridge after modification and an external body according to the first embodiment of the present disclosure.

FIG. 4 illustrates a state schematic before the combination of a low-capacity-type ink cartridge after modification and an external body according to the first embodiment of the present disclosure. FIG. 5 illustrates a state schematic after the combination of a low-capacity-type ink cartridge after modification and an external body according to the first embodiment of the present disclosure.

Since the gas outlet 43 and the ink inlet 44 are additionally disposed in the remanufactured ink cartridge, the gas outlet 43 and the ink inlet 44 may be respectively sealed before filling the ink cartridge C1 with the ink. As shown in FIG. 4, the ink cartridge C1 may further include a self-sealing member 70 for sealing the gas outlet 43 and the ink inlet 44. The self-sealing member 70 may be automatically sealed without external force, and may include a sealing body 71 with an insertion opening 73 and an end flange 72 formed on the sealing body 71. The sealing body 71 may match the gas outlet 43 and the flange 72 may match the stepped surface 431. Along the front-rear direction, the self-sealing member 70 after being installed may not exceed the rear side plate 40. When the external body C2 is combined with the ink cartridge C1, the gas inflow tube 88 may be inserted into the cavity of the ink cartridge C1 through the insertion opening 73, thereby implementing the gas connection between the cavity of the ink cartridge C1 and the cavity of the external member 80.

Similarly, the ink inlet 44 may be sealed by the self-sealing member 70, and the ink outflow tube 89 may be inserted into the cavity of the ink cartridge C1 through the insertion opening 73, thereby implementing the ink (liquid) communication between the cavity of the ink cartridge C1 and the cavity of the external member 80. Since the sealing part 70 does not exceed the rear side plate 40, as shown in FIG. 5, when the external body C2 is combined with the ink cartridge C1, the rear side plate 40 of the ink cartridge C1 and the front side plate 81 of the external member 80 may be tightly combined, thereby improving the aesthetic appearance of the remanufactured ink cartridge C.

Optionally, the gas outlet 43 may be set as the gas outflow tube and the ink inlet 44 may be set as the ink inflow tube in the ink cartridge C1. Correspondingly, the gas inflow tube 88 may be set as the gas inlet, and the ink outflow tube 89 may be set as the ink outlet in the external member 80.

Replacement of the External Body

As described above, the external body C2 and the modified ink cartridge C1 may be combined to form the remanufactured ink cartridge C, and the remanufactured ink cartridge C may be filled with ink similar to the ink cartridge before modification. When the ink line in the ink cartridge C1 is higher than the gas outlet 43 along the up-down direction, the ink in the ink cartridge C1 may be consumed first. When the ink line in the ink cartridge C1 is lower than the gas outlet 43 along the up-down direction, the air entering the cavity of the ink cartridge C1 may enter the ink storage space S4 of the external member 80 through the gas outlet 43, which may cause the air pressure in the ink storage space S4 to increase, and the ink in the ink storage space S4 may flow into the cavity of the ink cartridge C1 through the ink outflow tube 89, such that the ink line in the cavity of the ink cartridge C1 is consistent with the gas outlet 43, and the process may repeat until the ink in the external body C2 may be completely consumed. Next, the ink in the cavity of the ink cartridge C1 may start to be consumed. Before the ink in the external member C2 is completely consumed, the amount of ink in the cavity of the ink cartridge C1 may be constantly maintained at a fixed value, that is, the position where the ink line and the gas outlet 43 have a same height. Even if the ink cartridge C is shaken during the operation of the inkjet printer, the pressure variation of the ink cartridge C1 on the print head may be negligible, thereby ensuring the stable print quality.

The operator may observe the amount change of the ink in the ink storage space S4 of the external member 80 at any time through the transparent covering part 86, and the ink outflow tube 89 may be disposed adjacent to the separation plate G, which may cause the ink in the ink storage space S4 to be completely consumed. In one embodiment, the external member C2 may be replaceable, that is, the external body C2 and the ink cartridge C1 may be combined in a separable manner. When the operator observes that the ink in the ink storage space S4 is completely consumed, the external body C2 where the ink is completely consumed may be separated from the ink cartridge C1, and then may be replaced with a new external body C2 which is combined with the ink cartridge C1.

The replacement process of the external body C2 may be the following.

The external body C2 where the ink is completely consumed may first be separated from the ink cartridge C1. Since the self-sealing member 70 has the self-sealing function, when the gas inflow tube 88 and the ink outflow tube 89 are disconnected from the gas outlet 43 and the ink inlet 44 respectively, the self-sealing member 70 on the gas outlet 43 and the ink inlet 44 may be sealed automatically, such that the ink in the ink cartridge C1 may not flow out.

Then, the front side plate 81 where the gas inflow tube 88 and the ink outflow tube 89 of a prepared external body C2 are located may be placed upward, and the rear side plate 40 where the gas outlet 43 and the ink inlet 44 of the ink cartridge C1 are located may be placed downward. In such way, the gas outlet 43 may correspond to the gas inflow tube 88, the ink inlet 44 may correspond to the ink outflow tube 89, and at least one of the rib 61 and the rib 31 may correspond to the clamping space 93; and the ink cartridge C1 and the new external body C2 may be finally combined.

By setting the external body C2 to be replaceable, the operator may combine the external body C2, with a corresponding capacity, with the ink cartridge C1 according to the model of the inkjet printer, thereby remanufacturing a corresponding remanufactured ink cartridge C. That is, the capacity of the manufactured ink cartridge C may not be a fixed value and may be arbitrarily changed according to demands.

As disclosed above, the remanufacturing method in one embodiment may not only applicable to the new ink cartridge C1 formed by injection molding, but also to the existing ink cartridge C0 where the ink has been completely consumed. However, when the existing ink cartridge C0, where the ink has been completely consumed, is used, the ink cartridge C0 may need to be modified or remanufactured to form the ink cartridge C1, such that the connecting part or the connected part 90 may be formed at the ink cartridge C1. The remanufacturing method is described in the following.

The external body C2 containing ink may be prepared.

The closing plate 41, the arc portion 42, the first supporting plate 32 on the polyhedron of the ink cartridge before modification or the ink cartridge needed to be remanufactured may be cut off to form the modified ink cartridge C1.

The gas outlet 43 and the ink inlet 44 may be disposed at the rear side plate 40.

A portion (the connected part 90) of the external body C2 may be inserted between the top side plate 30 and the top plate 60, such that at least one of the upper rib 61 and the lower rib 31 may be opposite to the external body 32. The external body C2 may be in gas and fluid communication with the polyhedron C1 through the gas outlet 43 and the ink inlet 44.

Cutting off the first supporting plate 32 may include cutting off the left supporting plate 32*a* at the left side of the second supporting plate and the right supporting plate 32*b* at the right side of the second supporting plate. Finally, the second supporting plate 62 may also be disposed between the top side plate 30 and the top plate 60.

The external body C2 and the polyhedron (modified ink cartridge) C1 may be combined in a separable manner. Since communication between the gas connection and the ink (liquid) are formed between the external body C2 and the polyhedron (modified ink cartridge) C1, the remanufactured ink cartridge C may be formed.

Embodiment 2

The remanufactured ink cartridge C in the embodiments of the present disclosure may be remanufactured from a low-capacity model ink cartridge C0 where the ink is completely consumed; during the remanufacturing process, there is no need to install the external body C2 at the modified low-capacity ink cartridge C1, which are described in detail hereinafter.

Figure 6A:
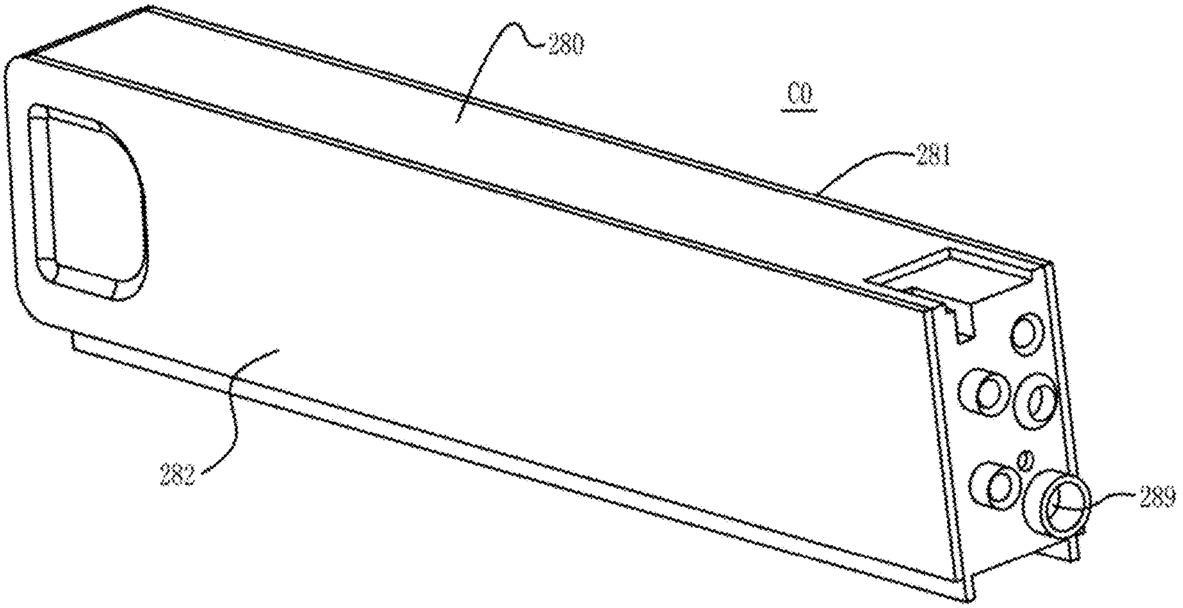
FIG. 6A illustrates a stereoscopic view of a low-capacity-type ink cartridge before modification according to the second embodiment of the present disclosure.
Figure 6B:
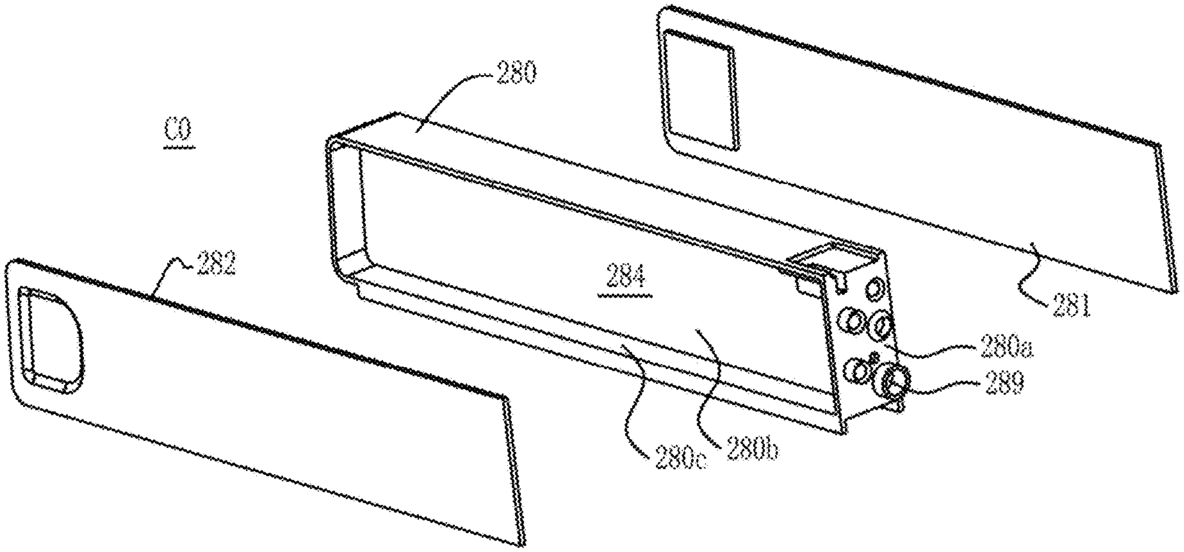
FIGS. 6B-6C illustrate exploded views of a low-capacity-type ink cartridge before modification according to the second embodiment of the present disclosure.
Figure 6C:
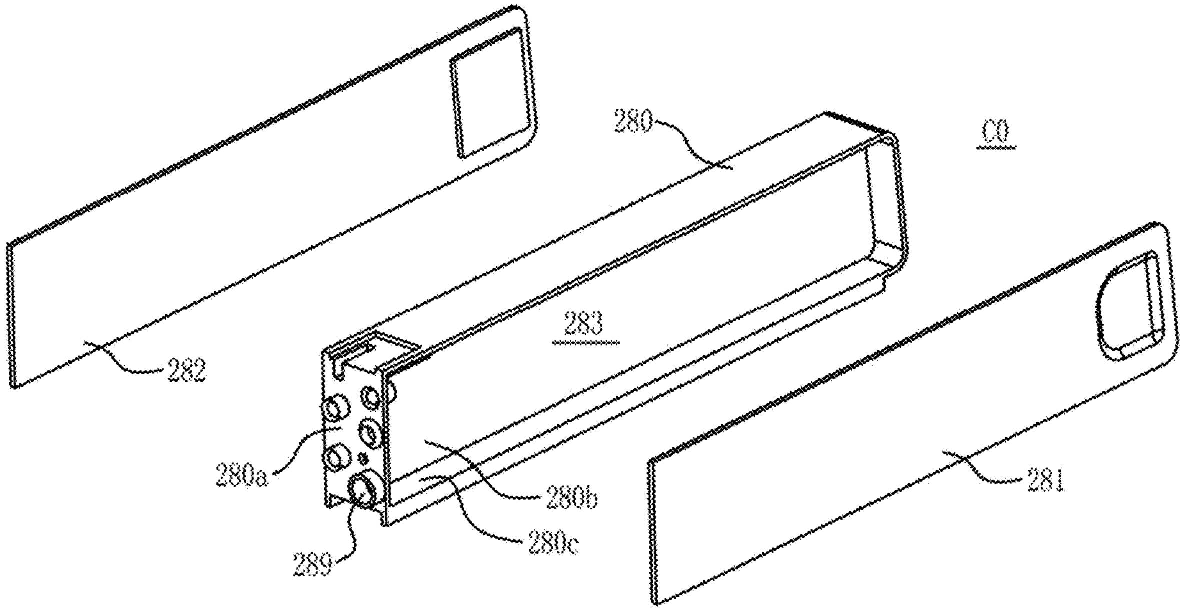
Figure 6D:
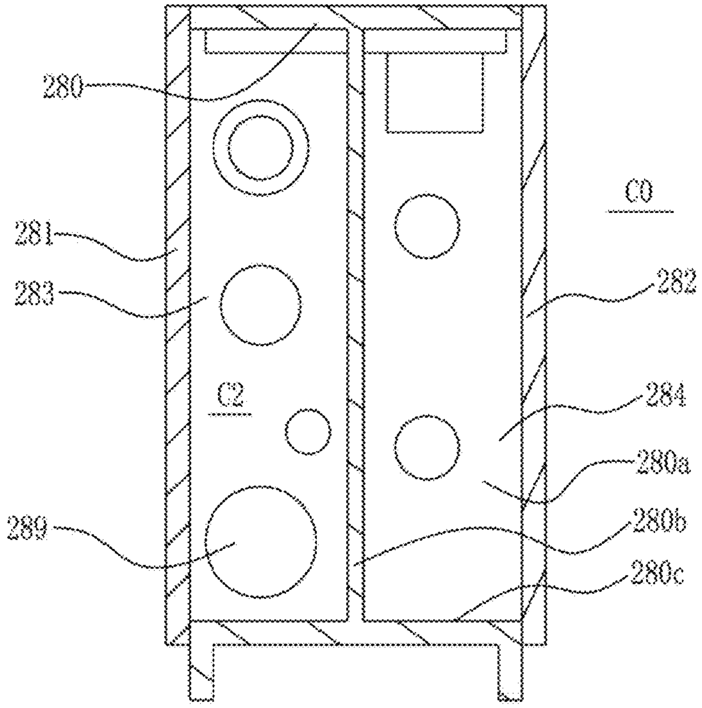
FIG. 6D illustrates a cross-sectional view of a low-capacity-type ink cartridge before modification along a direction perpendicular to the length direction of the ink cartridge according to the second embodiment of the present disclosure.

FIG. 6A illustrates a stereoscopic view of a low-capacity-type ink cartridge before modification according to the second embodiment of the present disclosure. FIGS. 6B-6C illustrate exploded views of a low-capacity-type ink cartridge before modification according to the second embodiment of the present disclosure. FIG. 6D illustrates a cross-sectional view of a low-capacity-type ink cartridge before modification along a direction perpendicular to the length direction of the ink cartridge according to the second embodiment of the present disclosure.

The low-capacity model ink cartridge C0 before modification, a polyhedron capable for containing ink, may include a main body 280, and a first end cover 281 and a second end cover 282 which are respectively combined with the main body 280. The main body 280 may include a front side plate 280*a*, and a separation plate 280*b* and a bottom side plate 280*c* which are connected to the front side plate 280*a*. The separation plate 280*b* and the bottom side plate 280*c* may be connected to each other. An ink outlet 289 may be disposed at the front side plate 280*a*, and the cavity of the ink cartridge C0 may be divided into a first cavity 283 and the second cavity 284 by the separation plate 280*b*. The ink outlet 289 may be connected to the first cavity 283; the first end cover 281 may close the first cavity 283; the second end cover 282 may close the second cavity 284; and the first cavity 283 and the second cavity 284 may be polyhedrons capable for containing ink.

In the ink cartridge C0, the first cavity 283 and the second cavity 284 are isolated from each other and may not communicate with each other. Only the first cavity 283 contains ink which may be supplied outward through the ink outlet 289. In order to obtain an ink cartridge C with larger capacity, the ink cartridge C0 may be modified in one embodiment, such that fluid communication including gas connection and ink (liquid) communication may be formed between the first cavity 283 and the second cavity 284.

Figure 7:
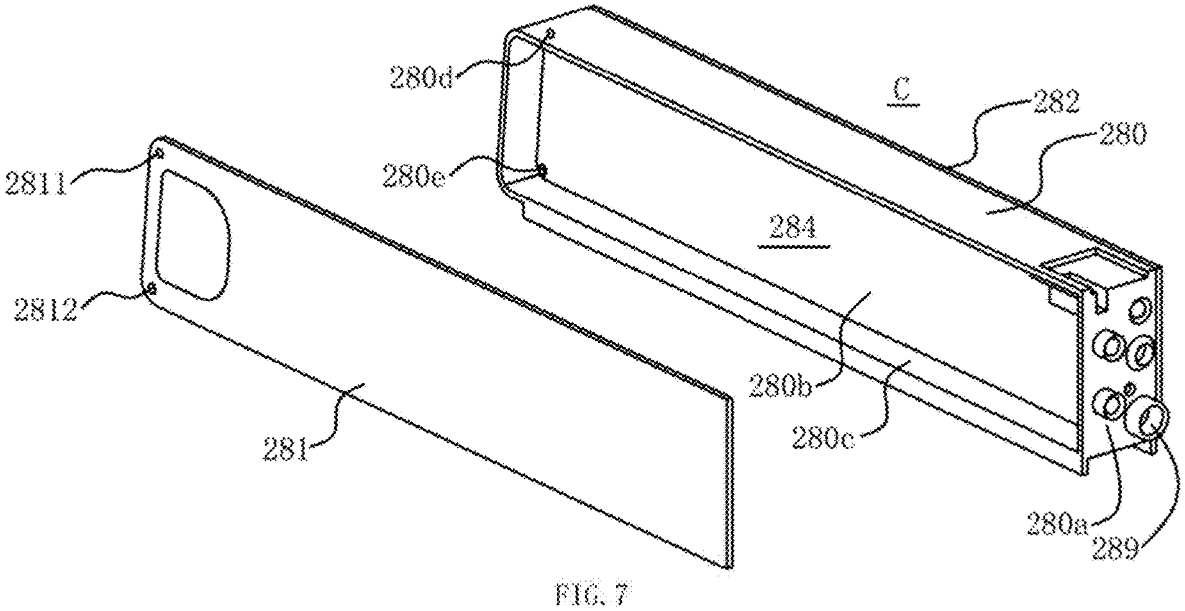
FIG. 7 illustrates a schematic of a low-capacity-type ink cartridge after modification according to the second embodiment of the present disclosure.

FIG. 7 illustrates a schematic of a low-capacity-type ink cartridge after modification according to the second embodiment of the present disclosure.

As shown in FIG. 7, a gas exchange opening 280*d* and a liquid exchange opening 280*e* separated from the gas exchange opening 280*d* may be disposed in the separation plate 280*b*. The first cavity 283 and the second cavity 284 may respectively implement gas exchange through gas exchange opening 280*d* and liquid exchange through the liquid exchange opening 280*e*. Furthermore, the gas exchange opening 280*d* and the liquid exchange opening 280*e* may be disposed separately, the position of the gas exchange opening 280*d* may be higher than the position of the liquid exchange opening 280*e*, and the liquid exchange opening 280*e* may be disposed adjacent to the bottom side plate 280*c*, thereby ensuring that the ink in the second cavity 284 may be completely consumed without being wasted.

Furthermore, along the length direction of the ink cartridge C0, the gas exchange opening 280*d* and the liquid exchange opening 280*e* may be disposed at an end of the separation plate 280*b* away from the front side plate 280*a*; when the gas exchange opening 280*d* and the liquid exchange opening 280*e* perform gas and liquid exchange, the design may facilitate the pressure change reduction adjacent to the ink outlet 289, thereby avoiding possible image forming defects caused by the pressure change.

The working process of the ink cartridge C remanufactured in such manner may be the same as the working process of the ink cartridge C in the first embodiment. When the ink in the first cavity 283 is sucked out, the air entering the first cavity 283 may enter the second cavity 284 through the gas exchange opening 280*d*. As the air pressure in the second cavity 284 increases, the ink stored in the second cavity 284 may be refilled into the first cavity 283 through the liquid exchange opening 280*a*, such that the amount of ink in the first cavity 283 may remain constant until the ink in the second cavity 284 is completely consumed.

Since the second cavity 284 and the first cavity 283 are integrally formed, there is no need to separately install the external body C2 in one embodiment. The low-capacity ink cartridge after disposing the gas exchange opening 280*d* and the liquid exchange opening 280*e* at the separation plate 280 may be the remanufactured ink cartridge C1. The second cavity 284 and the external member 80 in the above embodiments may both increase the capacity of the ink cartridge. The second cavity 284 and the external member 80 may be referred to as a remanufacturing part, and the fluid communication may be formed between the remanufacturing part and the modified ink cartridge.

For the formation manner of the gas exchange opening 280*d* and the liquid exchange opening 280*e* at the separation plate 280, for example, at least one of the first end cover 281 and the second end cover 282 may be removed, then the gas exchange opening 280*d* and the liquid exchange opening 280*e* may be disposed at the separation plate 280. However, from the aspect of reducing the production process, a first opening 2811 and a second opening 2812 may formed at the first end cover 281 or the second end cover 282, without removing the first end cover 281 and the second end cover 282. The first opening 2811 may correspond to the gas exchange opening 280*d*, the second opening 2812 may be corresponding to the liquid exchange opening 280*e*, and the first opening 2811 and the second opening 2812 may be finally sealed.

Figure 8A:
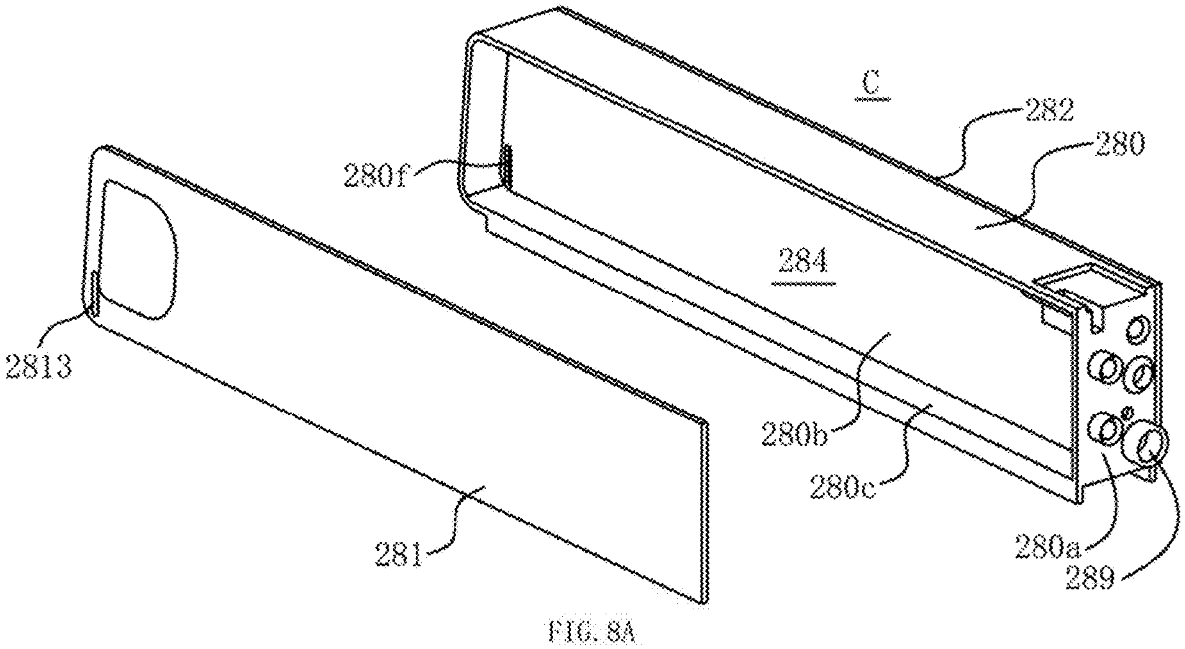
FIG. 8A illustrates a stereoscopic view of a low-capacity-type ink cartridge after modification using another manner according to the second embodiment of the present disclosure.
Figure 8B:
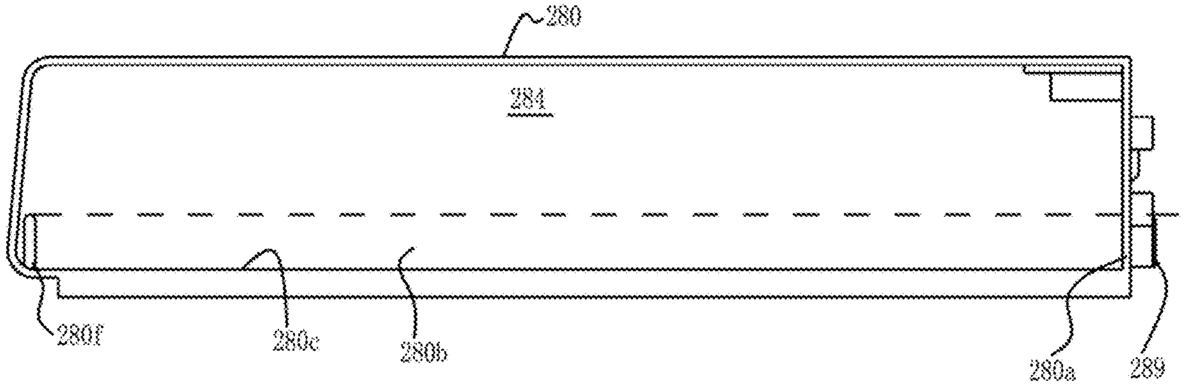
FIG. 8B illustrates a side view of a low-capacity-type ink cartridge after modification using another manner according to the second embodiment of the present disclosure.

FIG. 8A illustrates a stereoscopic view of a low-capacity-type ink cartridge after modification using another manner according to the second embodiment of the present disclosure. FIG. 8B illustrates a side view of a low-capacity-type ink cartridge after modification using another manner according to the second embodiment of the present disclosure. Based on a same concept in one embodiment, the gas exchange opening 280*d* and the liquid exchange opening 280*e* may be designed as the shapes shown in FIGS. 8A-8B.

As shown in FIG. 8A, an exchange opening 280*f*, which facilitates the gas exchange and liquid exchange between the first cavity 283 and the second cavity 284, may be disposed at the separation plate 280*b*. That is, the first cavity 283 and the second cavity 284 may perform gas exchange and liquid exchange simultaneously using the exchange opening 280*f* Furthermore, the exchange opening 280*f* may be disposed a position adjacent to the bottom side plate 280*c*, thereby ensuring that the ink in the second cavity 284 may be completely consumed without being wasted. Optionally, the exchange opening 280*f* may be disposed at an end of the separation plate 280*b* away from the front side plate 280*a* along the length direction of the ink cartridge. Similarly, the above-mentioned design may facilitate the pressure change reduction adjacent to the ink outlet 289, thereby avoiding possible image forming defects caused by the pressure change. Optionally, as shown in the dashed line in FIG. 8B, the highest point of the exchange opening 280*f* may be higher than the ink outlet 289, thereby sufficiently consuming the ink in the first cavity 283 and the second cavity 284.

When the ink cartridge C manufactured using the above-mentioned manner is in operation, the ink in the first cavity 283 may be partially consumed first. When the ink line in the first cavity 283 is lower than the height of the exchange port 280*f*, the air in the first cavity 283 may enter the second cavity 284 through the exchange opening 280*f* Meanwhile, the ink in the second cavity 284 may be refilled to the first cavity 283 through the exchange opening 280*f*, such that the amount of ink in the first cavity 283 may return to a position higher than the exchange opening 280*f*. The process may repeat, and the amount of ink in the first cavity 283 may be remained at a position higher than the exchange opening 280*f* until the amount of ink in the second cavity 284 drops to a position below the exchange opening 280*f*. Next, the amount of ink in the first cavity 283 and the second cavity 284 may be maintained at a same height. Similarly, a third opening 2813 corresponding to the exchange opening 280*f* may also be disposed at the first end cover 281 or the second end cover 282. Through the third opening 2813, the operator may conveniently dispose the exchange opening at the separation plate 280*b*, and the third opening 2813 may be sealed after disposing the exchange opening 280*f*.

Embodiment 3

Figure 9:
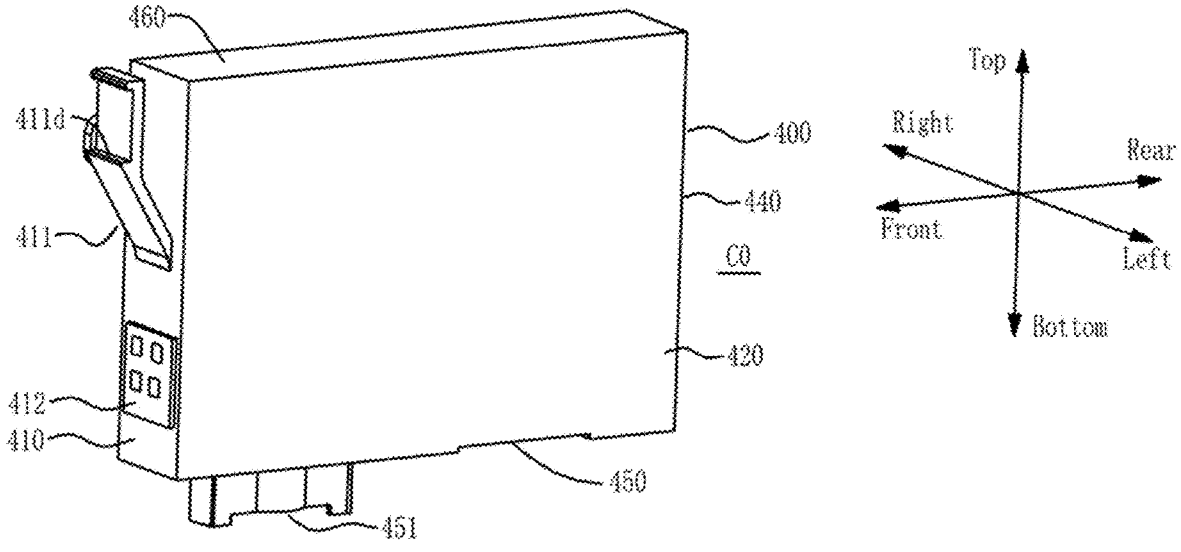
FIG. 9 illustrates a stereoscopic view of a low-capacity-type ink cartridge before modification according to the third embodiment of the present disclosure.

FIG. 9 illustrates a stereoscopic view of a low-capacity-type ink cartridge before modification according to the third embodiment of the present disclosure.

As shown in FIG. 9, the ink cartridge C0 before modification (need to be remanufactured) may include a polyhedron case 400 and an engagement part 411 on the case 400. The case 400 may include a front side plate 410 at the front side, a rear side plate 440 at the rear side, a bottom side plate 450 at the bottom side, side plates 420 at the left/right sides, an ink discharge part 451 formed at the bottom side plate 450, a top side plate 460 at the top side. The front side plate 410, the rear side plate 440, the bottom side plate 450, the top side plate 460 and side plates 420 may be enclosed to form a cavity containing ink. When the case 400 is installed, the ink-suctioning needle in the inkjet printer may be inserted into the ink discharge part 451 and an upward reaction force may be generated on the case 400, the engagement part 411 may be used to offset the reaction force by engaging (combining) with a corresponding part of the inkjet printer. For example, a holding surface 411*d*, which is used for combining the installed case 400 with a corresponding part in the inkjet printer, may be disposed at the engagement part 411, thereby restricting the movement of the case 400.

The ink cartridge C0 may further include a chip 412 installed therein, which may store information such as the model and lifetime of the ink cartridge C0, and the like. As shown in FIG. 9, the chip 412 and the engagement part 411 may both be positioned on the front side plate 410, and the chip 412 may be more adjacent to the ink discharge part 451 than the engagement part 411.

By comparing the existing high-capacity ink cartridge and the low-capacity ink cartridge, the relative position of the chip 412 and the ink discharge part 451 may be same along the up-down direction of the case 400. The difference may be that the position of the engagement part 411 relative to the ink discharge part 451 may be slightly different along the up-down direction of the case 400. That is, when the ink discharge part 451 is used as a reference, the engagement parts 411 of the above-mentioned ink cartridges may be different.

In one embodiment, the manner that the low-capacity ink cartridge with the engagement part is remanufactured to form the high-capacity ink cartridge with the engagement part may be described, and when the ink discharge part is used as a reference, the positions of the engagement parts of the high-capacity ink cartridge and the low-capacity ink cartridge may be different.

Figure 10A:
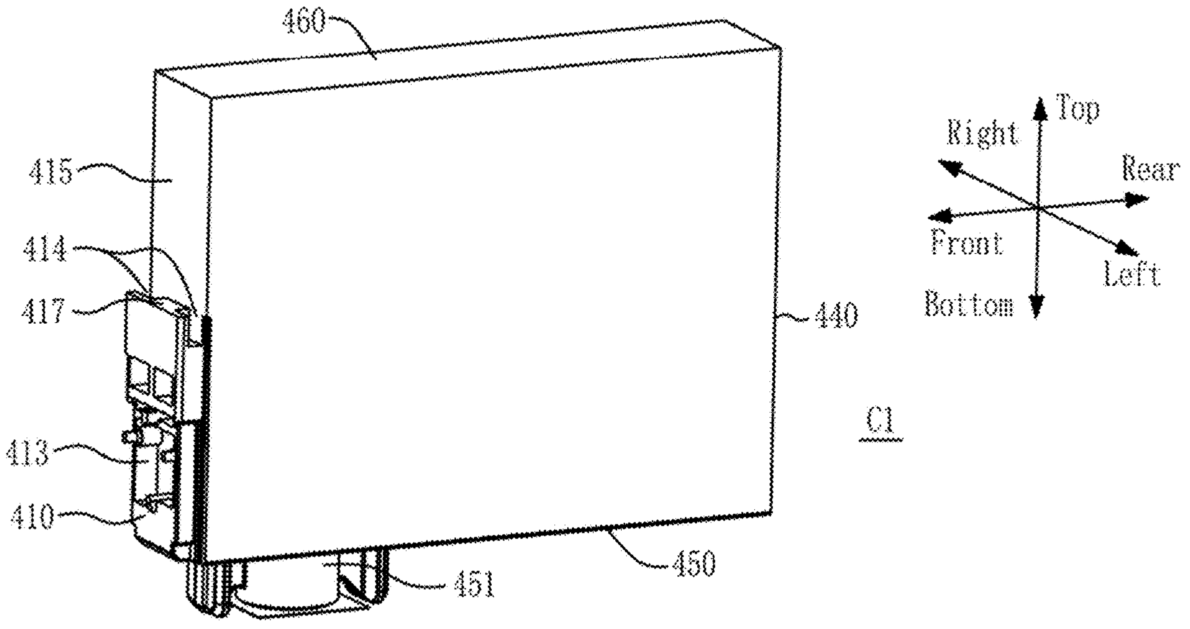
FIGS. 10A-10B illustrate stereoscopic views of a low-capacity-type ink cartridge after modification according to the third embodiment of the present disclosure.
Figure 10B:
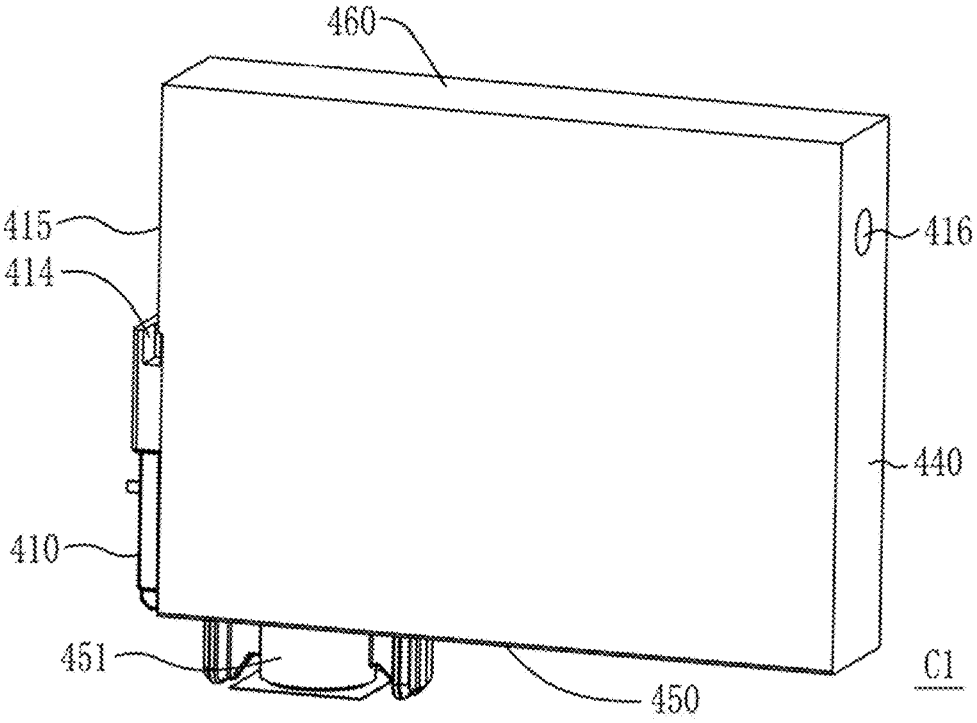

FIGS. 10A-10B illustrates stereoscopic views of a low-capacity-type ink cartridge after modification according to the third embodiment of the present disclosure. As shown in FIGS. 10A-10B, the front side plate 410 where the engagement part 411 is located may be partially cut off to remove the engagement part 411, thereby forming the modified ink cartridge C1; a combining surface 415 may be formed on the case 400 corresponding to the original engagement part 411. A chip installation part 413 for installing the chip 412 may be still on the uncut front side plate 410. Along the front-rear direction of the ink cartridge C1, the combining surface 415 may be behind the front side plate 410, and a transition surface 417 may be formed between the combining surface 415 and the front side plate 410. Along the up-down direction of the ink cartridge C1, a combining groove 414 may be formed on the transition surface 417.

Similar to the first embodiment, for the remanufacturing method in one embodiment, the existing low-capacity ink cartridge C0 may be modified to form the modified ink cartridge C1 to be used using the above-mentioned method, and then the remanufactured ink cartridge C may be finally formed by combining the modified ink cartridge C1 and the external body C2.

Figure 11A:
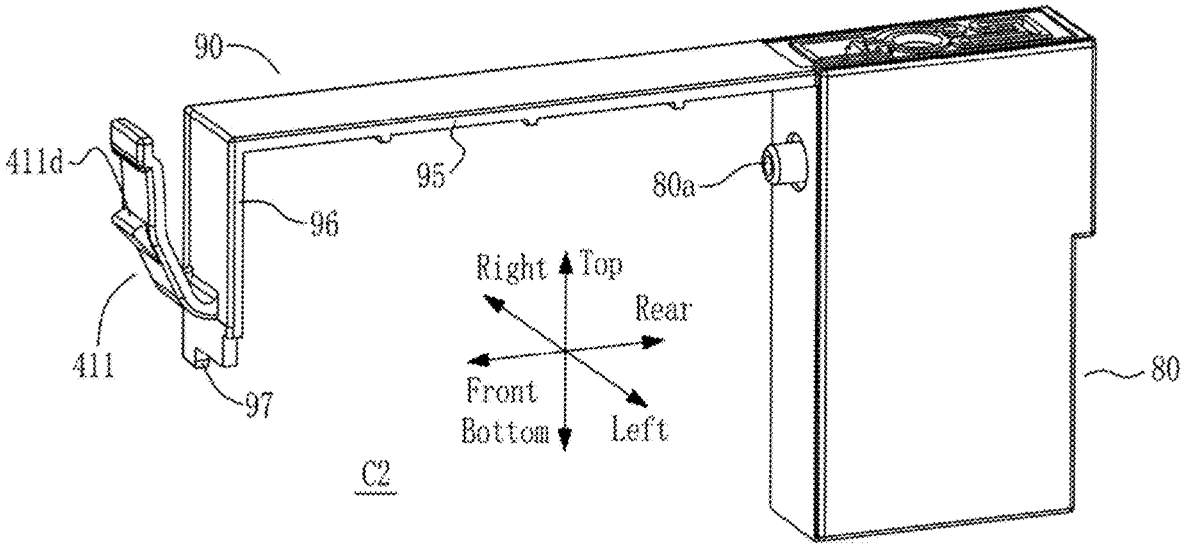
FIGS. 11A-11B illustrate stereoscopic views of an external body according to the third embodiment of the present disclosure.
Figure 11B:
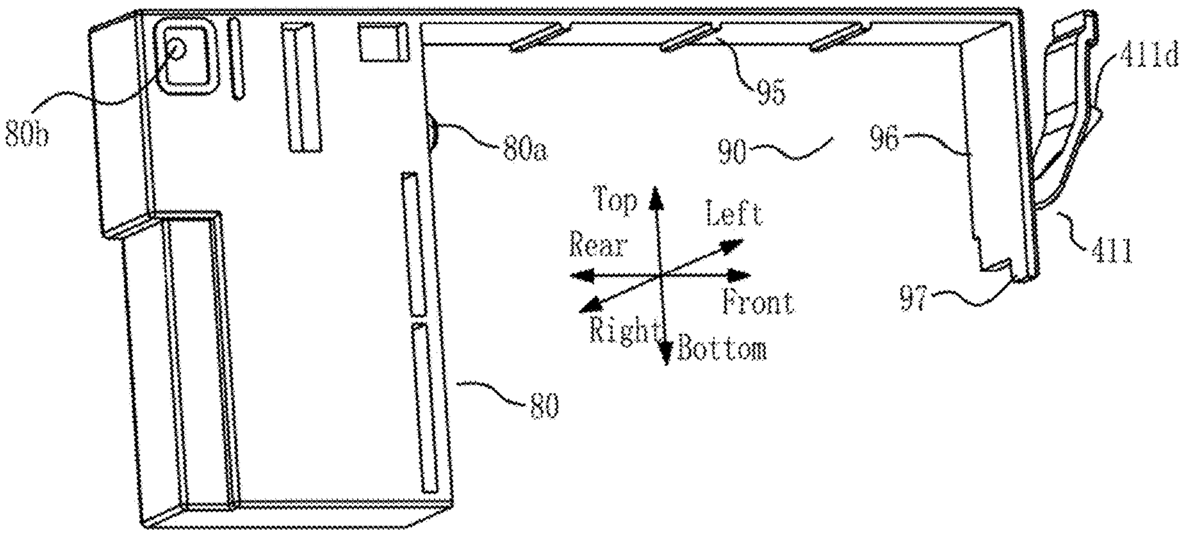
Figure 12:
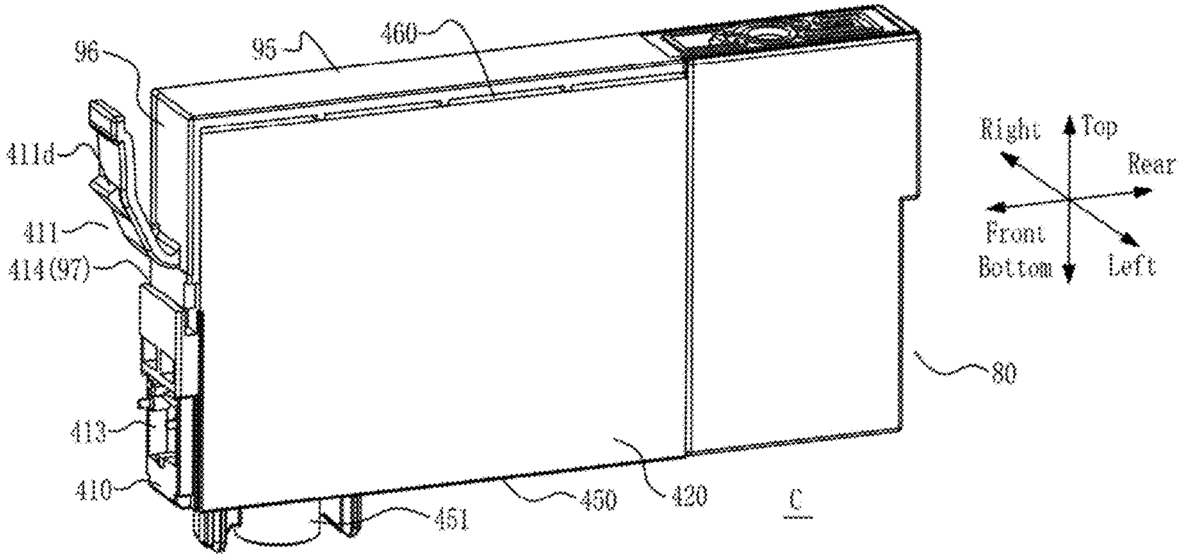
FIG. 12 illustrates a stereoscopic view of a low-capacity-type ink cartridge after modification after being combined with an external body according to the third embodiment of the present disclosure.

FIGS. 11A-11B illustrate stereoscopic views of an external body according to the third embodiment of the present disclosure. FIG. 12 illustrates a stereoscopic view of a low-capacity-type ink cartridge after being modified after being combined with the external body according to the third embodiment of the present disclosure.

In one embodiment, the external body C2 may include the external member 80, the connected part 90 combined with the external member 80, and the engagement part 411 combined with the connected part 90. The external body C2 may have overall flattened shape, that is, the external member 80 and the engagement part 411 may be located at two ends of the connected part 90. Optionally, the engagement part 411, the connected part 90 and the external member 80 may be integrally formed. As shown in FIGS. 11A, 11B and 12, when the external member 80 needs to be filled with ink, a connecting part 80*a*, used for the connection with the cavity of the modified ink cartridge C1, may be disposed at the external member 80. Correspondingly, the connected part 416 combining with the connecting part 80*a* may be disposed at the modified ink cartridge C1. Optionally, the connecting part 80*a* may be a hollow column protruding from the external member 80, and the connected part 416 may be a connection hole disposed in the ink cartridge C1. The positions of the connecting part 80*a* and the connected part 416 may be exchanged. The connected part 90 may include a first connecting plate 95 which is connected to the external member 80, a second connecting plate 96 which is connected to the first connecting plate 95, and a combined portion 97 which is at least disposed at one of the first connecting plate 95 and the second connecting plate 96. The first connecting plate 95 may be opposite to the top plate 460, the second connecting plate 96 may be opposite to the combining surface 415, the engagement part 411 may be located before the second connecting plate 96, the combined portion 97 may be a protrusion (also referred to a protrusion 97) extending from the second connecting plate 96 and may be combined with the combining groove 414 on the transition surface 417. Finally, as shown in FIG. 12, the external body C2 may be combined with the modified ink cartridge C1 to form the remanufactured ink cartridge C. The external dimensions of the remanufactured ink cartridge C may be the same as the external dimensions of the high-capacity ink cartridge.

In addition to the manner that the protrusion 97 is combined with the combining groove 414, the combining manner of the connected part 90 and the modified ink cartridge C1 may also be any one or more of the manners including gluing, welding, snapping, and the like. For the combining manner of the external body C2 and the modified ink cartridge C1, when the first connecting plate 95 is opposite to the top side plate 460 and the second connecting plate 96 is opposite to the combining surface 415, the external body C2 may be combined with the modified ink cartridge C1 from the upper side to the lower side along the up-down direction, and the protrusion 97 may be inserted into the combining groove 414. In such way, the connected part 90 may be restricted by the combining groove 414 along a direction perpendicular to the up-down direction (vertical direction). For example, left and right sidewalls of the combining groove 414 may restrict the protrusion 97 from the left and right sides, the front side plate 410 and the combining surface 415, for forming the combining groove 414, may restrict the protrusion 97 from the front and rear sides. The external body C2 may be combined with modified ink cartridge C1 from the rear side to the front side along the front-rear direction of the ink cartridge. During such process, the first connecting plate 95 may be deformed, and the connecting part 80*a* and the connected part 416 may restrict the external member 80 along the up-down direction; and left and right sidewalls of the combining groove 414 may restrict the protrusion 97 from the left and right sides. Or the first connecting plate 95 may correspond to the top side plate 460 by means of a snap or rail installation, such that the first connecting plate 95 may be restricted along the up-down direction. The connected part 90 may be spatially restricted by at least the combining groove 414 along a direction perpendicular to the direction of combining the external body C2 with the ink cartridge C1.

In one embodiment, the engagement part 411/the holding surface 411*d* may be disposed at the second connecting plate 96. Since the external body C2 is a new injection-molded part, the ink cartridge remanufacturing manufacturers may re-arrange the position of the engagement part 411 in the external body C2 according to the position of the engagement part 411 of the high-capacity ink cartridge relative to the ink outlet 451. More precisely, the position of the holding surface 411*d* may be re-arranged at the external body C2, such that the remanufactured ink cartridge C may be used with the high-capacity ink cartridge interchangeably.

Furthermore, the engagement part 411/the holding surface 411*d* may be formed by extending the first connecting plate 95. At this point, the connected part 90 may only be opposite to the top plate 460, the front side plate 410 of the ink cartridge C0 before modification may not be cut off, the stepped surface 417 may not be needed, and the engagement part 411 of the ink cartridge C0 before modification may only need to be cut off. The spatial restriction of the connected part 90 along a direction perpendicular to the direction in which the external body C2 and the ink cartridge C1 are combined may be implemented by the combination of the first connecting plate 95 and the top plate 460 of the ink cartridge C1. The connected part 90 may be considered as a connecting member, used to connect the engagement part 411/the holding surface 411*d* and the external member 80. That is, the external body C2 may be simplified to include the external member 80, the connecting member 90 and the engagement part 411. The connecting member 90 may be used to connect the external member 80 and the engagement part 411 and may be combined with the modified ink cartridge C1. The position of the engagement part 411 at the connecting member 90 may be determined according to the position of the engagement part 411 in the target ink cartridge.

Compared with the existing remanufacturing method, for the remanufacturing method in one embodiment, the engagement part 411 may be connected to the external member 80 through the connecting member 90 and be installed with the combination of the external member 80 and the modified ink cartridge C1, and the engagement part 411 may not need to be installed at the modified ink cartridge C1 as an independent part. The volume of the engagement part 411 may be small and the installation precision of the engagement part 411 may be relatively high, which may not be convenient for operation. When the engagement part 411 is installed with the combination of the relatively large-sized external member 80 and the modified ink cartridge C1, the installation of the engagement part 411 may be more convenient.

As another implementation method, the front side plate 410 of the ink cartridge C0 before modification may also be completely cut off. That is, the engagement part 411 and the chip installation part 413 of the ink cartridge C0 before modification may both be cut off. At this point, both the engagement part 411 and the chip installation part 413 may need to be re-arranged at the second connecting plate 96. Compared with the previous embodiment, although the second connecting plate 96 is longer and the chip installation part 413 needs to be re-arranged, the combination of the second connecting plate 96 and the modified ink cartridge C1 may be more convenient. Similarly, the dimension of the ink cartridge C0 before modification may not be less than the dimension of the target ink cartridge along the up-down (height) direction. At this point, the top side plate 460 of the ink cartridge C0 may be completely cut off, and the first connecting plate 95 may replace the original top plate 460. When the dimension of the ink cartridge C0 before modification is less than the dimension of the target ink cartridge along the up-down direction, the top side plate 460 may not be cut off, the dimension of the first connecting plate 95 along the up-down direction may be set to be equal to the height difference of the target ink cartridge and the ink cartridge C0 before modification, thereby ensuring that the dimension of the remanufactured ink cartridge along the up-down direction is the same as the target ink cartridge.

In the above-mentioned embodiments, the first connecting plate 95 may pass through from the rear side to the front side by covering at least a portion of the top side plate 460 along the front-rear direction. In another manner, the first connecting plate 95 may pass through from the rear side to the front side by covering at least a portion of the side plate 420 or a portion of the bottom side plate 450 along the front-rear direction as long as the engagement part 411 may reach the front side plate 410.

As described above, whether the external member 80 is filled with ink may be determined according to the needs of end users. When the external member 80 does not need be filled with ink, the external member 80 may be used as the holding portion. At this point, the fluid communication may be formed or may not be formed between the external member 80 and the modified ink cartridge C1. When the fluid communication may not be formed between the external member 80 and the modified ink cartridge C1, the external member 80 may be disposed adjacent to the modified ink cartridge C1; at this point, the external member 80 may be used to increase the external dimensions of the modified ink cartridge C1.

When the external member 80 needs to be filled with ink, the fluid communication may be formed between the external member 80 and the modified ink cartridge C1, which may include a single hole connection manner and a double hole connection manner.

When the external member 80 and the modified ink cartridge C1 are connected by double holes, the description may refer to the embodiment one of the present disclosure, which may not be described herein in detail. When the external member 80 and the modified ink cartridge C1 are connected by a single hole, as described above, the connecting part 80*a* may be disposed at the external member 80, the connected part 416 which is connected to the connecting part 80*a* may be disposed at the modified ink cartridge C1. However, in order to control the air pressure in the cavities of the external member 80 and the modified ink cartridge C1, optionally, the air inlet disposed at the ink cartridge C0 before modification may be sealed to avoid the use, as shown in FIG. 11B, and the air inlet 80*b* may be disposed at the external member 80. Similarly, when the external member 80 and the modified ink cartridge C1 are connected by a single hole, the air inlet 80*b* may be disposed at a position of the external member 80 away from the ink outlet 451. In one embodiment, the air inlet 80*b* may be disposed at the upper side of the external member 80 to reduce the pressure change adjacent to the ink outlet 451.

According to the above-mentioned description, the remanufacturing method in one embodiment may include the following.

The external member C2 including the engagement part 411 may be prepared, and the position of the engagement part 411 in the external member C2 may be determined according to the relative position of the engagement part 411 of the target ink cartridge.

At least the engagement part 411 of the ink cartridge C0 before modification may be cut off to form the modified ink cartridge C1.

The external member C2 and the modified ink cartridge C1 may be combined to form the remanufactured ink cartridge C.

The position of the engagement part 411 in the external member C2 may be determined according to the relative position of the engagement part 411 of the target ink cartridge. For example, the position of the engagement part 411 in the external member C2 may be determined according to the position of the engagement part of the target ink cartridge relative to the position of the ink outlet 451, and may also be determined according to the position of the engagement part of the target ink cartridge relative to the position of the chip installation part 413 or other parts of the target ink cartridge, such as the bottom side plate 450 or the top side plate 460 of the target ink cartridge.

Embodiment 4

Figure 13A:
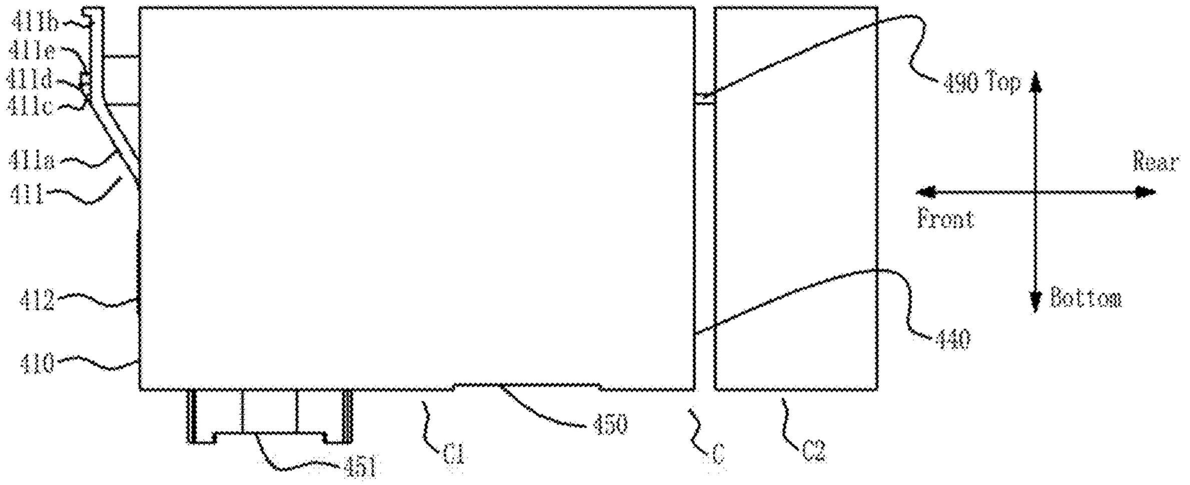
FIG. 13A illustrates a side view of the first combination manner of a low-capacity-type ink cartridge after modification and an external body according to the fourth embodiment of the present disclosure.
Figure 13B:
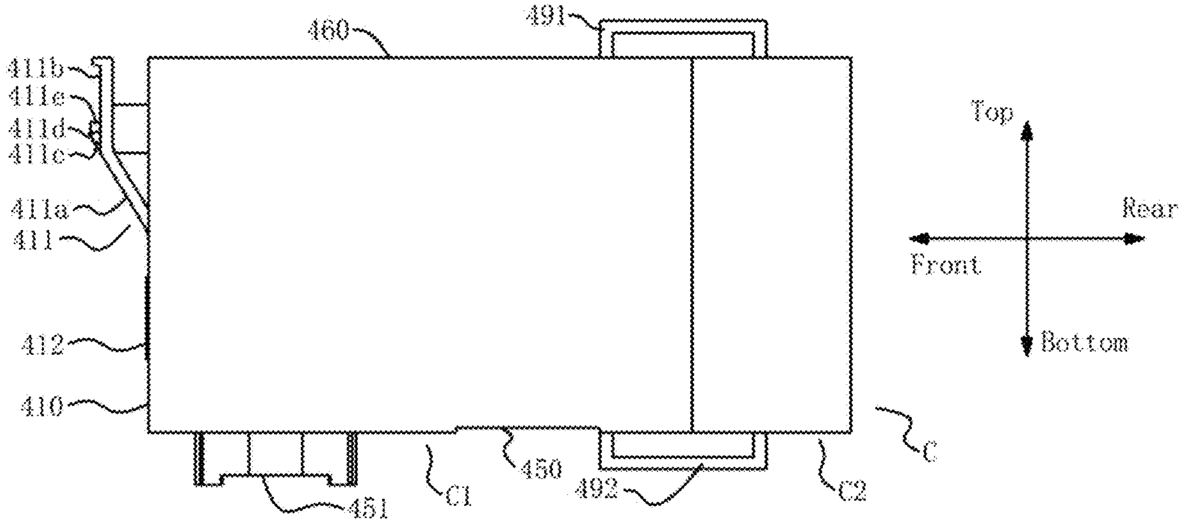
FIG. 13B illustrates a side view of the second combination manner of a low-capacity-type ink cartridge after modification and an external body according to the fourth embodiment of the present disclosure.

FIG. 13A illustrates a side view of the first combination manner of a low-capacity-type ink cartridge after modification and an external body according to the fourth embodiment of the present disclosure; and FIG. 13B illustrates a side view of the second combination manner of a low-capacity-type ink cartridge after modification and an external body according to the fourth embodiment of the present disclosure.

The ink cartridge in one embodiment has basically the same structure as the ink cartridge in the third embodiment; therefore, when describing the ink cartridge C0 before modification in the following, the ink cartridge may refer to FIG. 9, and same components as those in the third embodiment may have same numbers.

As shown in FIGS. 13A-13B, the case 400 may include the front side plate 410 located at the front, the rear side plate 440 located at the rear, the bottom side plate 450 located at the bottom, and the ink discharge part 451 formed on the bottom side plate 450.

When the case 400 is installed, the ink-suctioning needle in the inkjet printer may be inserted into the ink discharge part 451 and an upward reaction force may be generated on the case 400. In order to counteract the reaction force, the ink cartridge C0 before modification in one embodiment may further include the engagement part 411 on the case 400. The engagement part 411 may be used to combine with a corresponding part of the inkjet printer after the case 400 is installed, thereby restricting the movement of the case 400.

The ink cartridge C0 may further include the chip 412 installed therein, which stores information such as the model and lifetime of the ink cartridge C0. As shown in FIGS. 13A-13B, the chip 412 and the engagement part 411 may be co-located on the front side plate 410, and the chip 412 may be closer to the ink discharge part 451 than the engagement part 411.

One the existing high-capacity ink cartridges may have approximately same appearance as the ink cartridge C0. For the appearance of the low-capacity ink cartridge and high-capacity ink cartridge, the relative positions of the chip 412 and the ink discharge part 451 may be same along the up-down direction of the case 400. The difference may be that along the up-down direction of the case 400, the position of the engagement part 411 relative to the ink discharge part 451 may be slightly different. That is, when the ink discharge part 451 is used as a reference, the engagement parts 411 of above-mentioned two ink cartridges may be that one engagement part is at a high position and another engagement part is at a low position. Specifically, the engagement part of the low-capacity ink cartridge may be at a lower position than the engagement part of the high-capacity ink cartridge.

As shown in FIG. 13A, the engagement part 411 may include a base part 411*a* connected to the front side plate 410, and an extension part 411*b* extending from the base part 411*a*. The base part 411*a* may be arranged to be tilted with respect to the front side plate 410, and the extension part 411*b* may be in parallel with the front side plate 410. That is, the base part 411*a* may be inclined with respect to the vertical direction, and the extension part 411*b* may be in parallel with respect to the vertical direction. Therefore, the end user may elastically deform the entire engagement part 411 relative to the case 400 by pressing the extension part 411*b*.

Furthermore, along the front-rear direction of the case 400, the base part 411*a* may extend beyond a part of the extension part 411*b* to form a protrusion part 411*c*. The top surface of the protrusion part 411*c* may form a holding surface 411*d* perpendicular to the vertical direction. After the case 400 is installed, the holding surface 411*d* may be combined with the corresponding part of the inkjet printer to counteract the upward pushing force generated by the ink-suctioning needle against the case 400, thereby maintaining the case 400 at a preset position.

As described above, along the up-down direction of the case 400, compared the high-capacity ink cartridge and low-capacity ink cartridge, the relative positions of the chips 412 and the ink discharge parts 451 of above-mentioned two ink cartridges may be same, and the positions of the engagement parts 411 relative to the ink discharge parts 451 may be different. Therefore, when remanufacturing the low-capacity ink cartridge, the currently commonly used manner may be to maintain the engagement part 411 still, move the position of the chip 412, and change the position of the ink discharge part 451 at the same time; or maintain the chip 412 and the ink discharge part 451 still, remove the engagement part of the low-capacity ink cartridge first, and then install a new or removed engagement part to a same position as the engagement part of the high-capacity ink cartridge.

The above two manners both involve substantial restructuring of the ink cartridge C0, resulting in low production efficiency. In one embodiment, changing the relative positions of the engagement part 411, the chip 412 and the ink discharge part 451 in the existing low-capacity ink cartridge may not be considered; the modified ink cartridge C1 may be positioned in the inkjet printer suitable for the high-capacity ink cartridge by changing the position of the holding surface 411*d*. Such simple manufacturing process in such way may be beneficial for improving the remanufacturing efficiency of the low-capacity ink cartridge.

As shown in FIG. 13A, the first remanufacturing manner of the low-capacity ink cartridge provided by one embodiment may be to install a heightening part 411*e* on the holding surface 411*d*. At this point, the holding function of the engagement part 411 may be move from the original holding surface 411*d* to the upper surface of the heightening part 411*e*, which is equivalent to the original holding surface 411*d* being moved upward. Therefore, the engagement part

411 after the heightening part 411*e* is installed may be positioned in the inkjet printer suitable for the high-capacity ink cartridge.

In actual practice, the area of the holding surface 411*d* is small, and the operation of installing the heightening part 411*e* on the holding surface 411*d* is extremely inconvenient. Therefore, a further improved second remanufacturing manner is provided in one embodiment. Referring to FIG. 13A, the protrusion part 411*c* (shown by the dashed line in FIG. 13A) may be cut first, so that, along the front-rear direction of the case 400, the base part 411*a* may not extend beyond the extension part 411*b*; then the heightening part 411*e* may be installed, and after the heightening part 411*e* is installed, its upper surface and the holding surface of the high-capacity ink cartridge may be at a same position relative to the ink discharge part 451 of the high-capacity ink cartridge. At this point, the heightening part 411*e* may be equivalent to being directly positioned on the extension part 411*b*. Such manner may still ensure that the engagement part 411 after the heightening part 411*e* is installed can be positioned in the inkjet printer suitable for the high-capacity ink cartridge.

Furthermore, the third remanufacturing manner is provided in one embodiment. The protrusion part 411*c* may not need to be cut off, the heightening part 411*e* may also be directly installed on the engagement part 411 as an accessory, and after the heightening part 411*e* is installed, its upper surface and the holding surface of the high-capacity ink cartridge may be at a same position relative to the ink discharge part 451 of the high-capacity ink cartridge. For such manner, since only the heightening part 411*e* needs to be installed, there is no need to make any changes to the structure of the low-capacity ink cartridge C0. Although such manner is similar to the first manner, the installation freedom of the heightening part 411*e* may be higher, and the operation space may be greater in such manner. Therefore, such manner may be more beneficial for improving the remanufacturing efficiency of the low-capacity ink cartridge C0. Furthermore, the heightening part 411*e* may also be directly installed on the case 400 as an accessory, and after the heightening part 411*e* is installed, its upper surface and the holding surface of the high-capacity ink cartridge may be at a same position relative to the ink discharge part 451 of the high-capacity ink cartridge. In addition, at least a part of the heightening part 411*e* can move as whole engagement part 411 is elastically deformed. Therefore, the ink cartridge remanufactured in such manner may be installed in the inkjet printer smoothly. In other words, the height-enhancing part 411*e* may be installed on at least one of the engagement part 411 and the case 400; and at least a part of the heightening part 411*e* may move as whole engagement part 411 is elastically deformed.

Optionally, when there is no volume difference between the ink cartridge that needs to be modified (remanufactured) and the target ink cartridge and only the positions of the holding surfaces 411*d* relative to the ink discharge parts 451 are different, the heightening part 411*e* may also be installed on the ink cartridge that needs to be modified (remanufactured) with a relatively low holding surface 411*d* through the above-mentioned manner. Therefore, it may realize that the modified (remanufactured) ink cartridge may be applied to the inkjet printer which has a positioning structure different from the inkjet printer applicable to the ink cartridge before modification (remanufacture).

The above describes the remanufacturing manners of the low-capacity ink cartridge C0, so that the ink capacity of the low-capacity ink cartridge C1 after remanufacturing may also reach the ink capacity of the high-capacity ink cartridge. Referring to the manner of the first embodiment, the manner for increasing the capacity of the low-capacity ink cartridge C1 after remanufacturing is provided in one embodiment.

Referring to FIGS. 13A and 13B, the external body C2 may be installed on the modified low-capacity ink cartridge C1, and fluid communication (or fluid connection) may be formed between the external body C2 and the modified low-capacity ink cartridge C1; and finally, the size of the remanufactured ink cartridge C in the front-rear direction may be same as the size of the high-capacity ink cartridge in the front-rear direction. As shown in FIG. 13A, a connecting pipe 490 may be disposed on the rear side plate 440 of the low-capacity ink cartridge C1 after the remanufacturing. As shown in FIG. 13B, a first connecting pipe 491 may also be disposed on the top side plate 460 of the modified low-capacity ink cartridge C1 or a second connecting pipe 492 may be disposed on the bottom side plate 450 of the modified low-capacity ink cartridge C1. In other words, similar to the first embodiment, the connecting opening connecting the connection-modified low-capacity ink cartridge C1 and the external body C2 may be disposed on any surface except for the chip 412 and the arrangement part 411 installed thereon.

Embodiment 5

Figure 14:
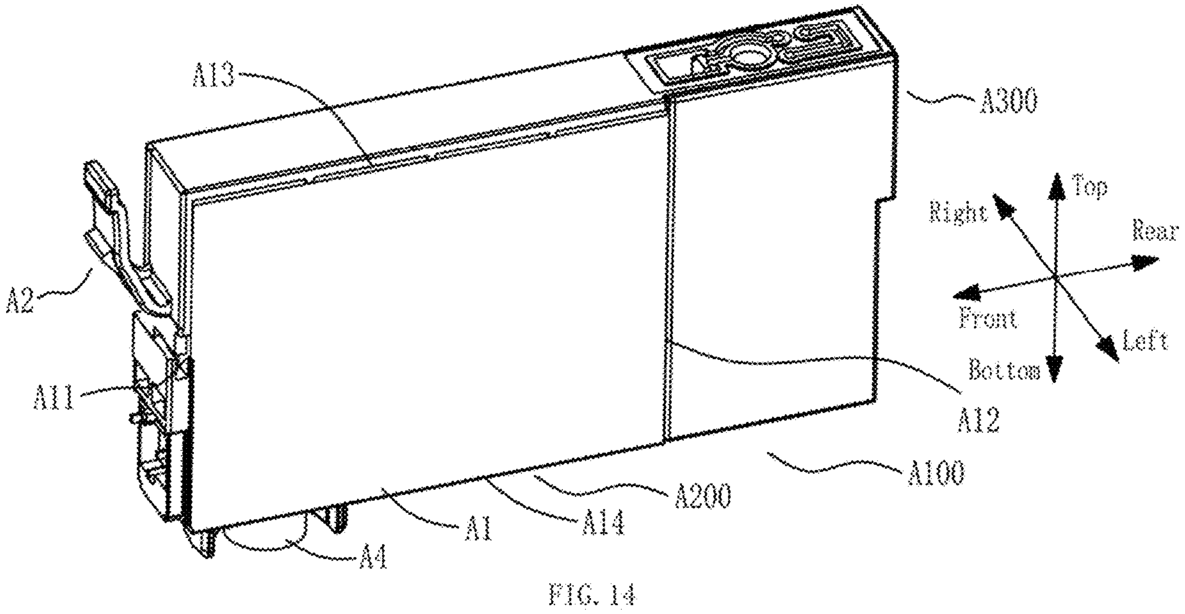
FIG. 14 illustrates a stereoscopic view of a remanufactured ink cartridge according to the fifth embodiment of the present disclosure.
Figure 15:
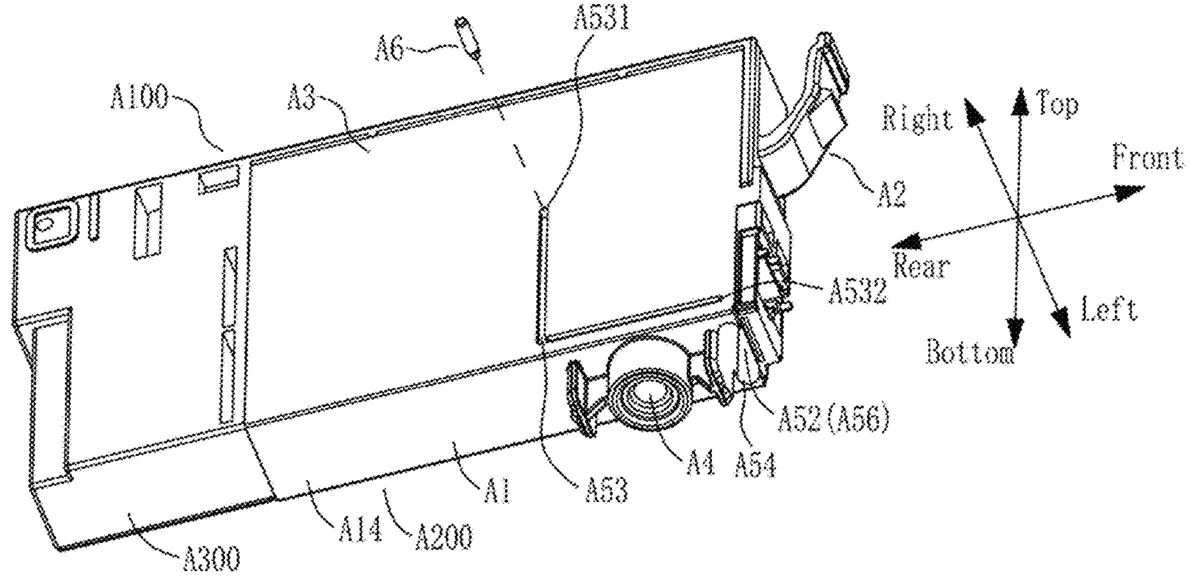
FIG. 15 illustrates a stereoscopic view of a remanufactured ink cartridge being viewed from the bottom according to the fifth embodiment of the present disclosure.
Figure 16:
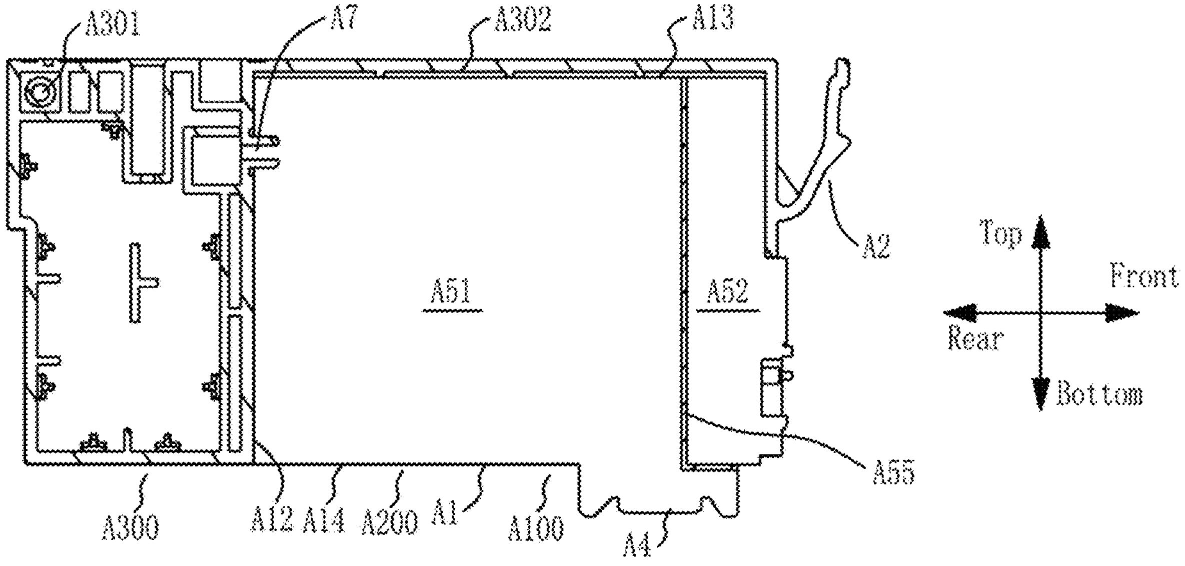
FIG. 16 illustrates a cross-sectional view of a remanufactured ink cartridge along a front-rear direction according to the fifth embodiment of the present disclosure.

FIG. 14 illustrates a stereoscopic view of a remanufactured ink cartridge according to the fifth embodiment of the present disclosure; FIG. 15 illustrates a stereoscopic view of a remanufactured ink cartridge being viewed from the bottom according to the fifth embodiment of the present disclosure; and FIG. 16 illustrates a cross-sectional view of a remanufactured ink cartridge along the front-rear direction according to the fifth embodiment of the present disclosure.

In one embodiment, the remanufactured ink cartridge A100 may include a case A200 containing ink, and an engagement part A2 and an ink discharge part A4 disposed on the case A200. The engagement part A2 may be in front of the case A200, and the ink discharge part A4 may be under the case A200. Specifically, the engagement part A2 may be in front of the case A200, and the ink discharge part A4 may be under the case A200; when the remanufactured ink cartridge A100 is installed along the up-down direction, the engagement part A2 and the engaged part disposed in the inkjet printer may be engaged with each other; the remanufactured ink cartridge A100 may be installed in the inkjet printer stably, and the ink discharge part A4 may be connected to the ink-suctioning needle in the inkjet printer, configured for supplying the ink in the cartridge A200 to the inkjet printer.

The case 200 may include a bottom cover A1 and a face cover A2 that are combined with each other, and a cavity for accommodating ink may be formed between the bottom cover A1 and the face cover A2. As shown in FIG. 16, the cavity may include the first cavity A51 and the second cavity A52 separated by a separation plate A55, and the first cavity A51 may be directly connected with the ink discharge part A4; and the volume of the first cavity A51 may be greater than the volume of the second cavity A52. In the original ink cartridge (the ink cartridge before remanufacturing), the first cavity A51 and the second cavity A52 may both be used to store ink and connected with each other through a channel A53 located on the face cover A2 or the bottom cover A1.

The appearance of the original ink cartridge and the remanufactured ink cartridge may be approximately same, but the difference may be that in the inkjet printer where the remanufactured ink cartridge is applied, a limiting protrusion may be disposed adjacent to the ink-suctioning needle. Correspondingly, the ink cartridge applicable to the inkjet printer may need to be disposed with a limiting groove that matches with the limiting protrusion. Specifically, along the up-down direction, the limiting protrusion may be opposite to the second cavity A52. For the original ink cartridge without the limit groove, after the ink cartridge is remanufactured by the above manners, it still cannot be applied to the inkjet printer with the limiting protrusion.

Therefore, a remanufacturing method for remanufacturing the original ink cartridge without the limiting groove, which can be applied to an inkjet printer with the limiting protrusion, is provided in one embodiment. The specific steps may be:

forming a limiting groove A56 facing the cavity (the second cavity A52) on the lower surface of the original ink cartridge, where the limiting groove A56 may have an opening A54 and be connected to the second cavity A52; along the front-rear direction, the limiting groove A56 may be located between the ink discharge part A4 and the engagement part A2; and blocking the channel A53 to cut off the fluid connection between the first cavity A51 and the second cavity A52.

Optionally, the limiting groove A56 may pass through and may be integrated with the second cavity A52. The remanufactured ink cartridge obtained by the above method may be applied to the inkjet printer with the limiting protrusion. At this point, the second cavity A52 may be opposite to the opening A54, the limiting protrusion may enter the limiting groove A56/the second cavity A52 through the opening A54, and the ink located in the first cavity A51 may not enter the second cavity A52 through the channel A53.

It can be understood that, before remanufacturing the original ink cartridge, the method may also include the step of cleaning the cavity. The manner to cut off the connection between the first cavity A51 and the second cavity A52 may be blocking the channel A53, which may specifically be installing a plugging part A6 in the connecting hole A531 between the channel A53 and the first cavity A51 or/and the connecting hole A532 between the channel A53 and the second cavity A52, or deforming the case around the channel A53 by ironing at a high temperature to block the channel A53, or installing a filler in the channel A53 to block the channel A53. The filler can be a fixed-shaped object such as the plugging part A6, a deformable object such as rubber, or even adhesive in the channel A53. Whether it is the plugging part A6, the filler, or an object entering the channel A53 through deformation, it can be called a blocking part, as long as it can cut off the connection between the first cavity A51 and the second cavity A52.

Optionally, when the structure of the original ink cartridge is similar to the structure of the empty cartridge C0 in the first embodiment, the ink discharge part A4 may be disposed on the front side surface A11, and the original ink cartridge may be installed forward and removed backward along the front-rear direction. If the inkjet printer to which the target ink cartridge is applied is disposed with the limiting protrusion, in the process of remanufacturing the original ink cartridge into the remanufactured ink cartridge, the remanufactured ink cartridge and the target ink cartridge may be interchangeable through forming the limiting groove on the case of the original ink cartridge. Therefore, the position of the above-mentioned limiting groove in the original ink cartridge may not be limited to the lower surface of the original ink cartridge but be configured according to the position of the ink discharge part.

Furthermore, to meet the needs of end users, the existing inkjet printer may be configured to be suitable for two kinds of ink cartridges with different sizes and capacities. The appearance of these two ink cartridges may be substantially same, only the cavity sizes may be different. Therefore, the remanufactured ink cartridge according to one embodiment can also be remanufactured into the high-capacity ink cartridge through capacity expansion.

As shown in FIGS. 14-16, the remanufactured ink cartridge A100 may also include an external body A300 connecting with the case A200, and a connecting hole A7 may be formed on the rear side surface A12 of the case. The external body A300 may be connected with the first cavity A51 through the connecting hole A7. In addition, the external body A300 may also be provided with an air inlet A301. As the ink is consumed, external air may enter the external body A300 or the first cavity A51 through the air inlet A301 to maintain the pressure balance in the remanufactured ink cartridge A100.

The external body A300 may be filled with an appropriate amount of ink according to the needs of the target ink cartridge. Furthermore, the external body A300 may not be filled with ink, and only serve as a gripping part to facilitate the user to grip the remanufactured ink cartridge.

Furthermore, in the case where the position of the engagement part A2 in the original ink cartridge is slightly different from that of the target ink cartridge, during the remanufacturing process of the original ink cartridge, the position of the engagement part A2 in the remanufactured ink cartridge may also be adjusted according to the position of the engagement part A2 in the target ink cartridge.

The specific adjustment method may be that as described in the third embodiment of the present disclosure, which may include cutting off the original engagement part A2 and disposing the new engagement part on the external body, where the relative position of the new engagement part in the remanufactured ink cartridge may be same as the relative position of the engagement part in the target ink cartridge; and may also be that as described in the fourth embodiment of the present disclosure, which may include maintaining the original engagement part A2 and disposing the heightening part A411*e* on the holding surface A411*d* of the original engagement part, such that the relative position of the heightening part in the remanufactured ink cartridge may be same as the relative position of the engagement part in the target ink cartridge.

When the adjustment method described in the third embodiment is used, the engagement part A2 and the main body of the external body A300 may be connected through a connecting plate A302, and the connecting plate A302 may cover the upper side surface A13 of the case A200. Even the air inlet of the original ink cartridge is configured on the upper side surface A13, the air intake in the remanufactured ink cartridge may not be affected since the external body A300 is configured with the air inlet A301.

As a simplified manner, the engagement part A2 may be no longer retained in the remanufactured ink cartridge, that is, the engagement part A2 may be cut off and may not be re-configured. At this point, the remanufactured ink cartridge may be held in the inkjet printer by means of its own gravity or by abutting/squeezing the protrusion provided on the case or the external body against the inner wall of the inkjet printer.

As disclosed above, the remanufactured ink cartridge of one embodiment may be configured with the limiting groove A56 on the case A200, and the channel A53 for connecting the first cavity A51 and the second cavity A52 may be blocked, that is, the connection between the first cavity A51 and the second cavity A52 may be cut off. The remanufactured ink cartridge may not only be suitable for inkjet printers with the limiting protrusions, but also for inkjet printers without the limiting protrusions. In addition, the remanufactured ink cartridge may also be configured with the external body A300 that can contain ink according to requirements, thereby further enhancing the versatility of the remanufactured ink cartridge.

As described above, in the present disclosure, the original low-capacity ink cartridge C0 may be processed to form the modified ink cartridge C1/A200, the prepared external member C2/A300 may be combined with the modified ink cartridge C1/A200, thereby forming the remanufactured ink cartridge C/A100. The dimensions of the remanufactured ink cartridge C/A100 may at least be same as the dimensions of the target ink cartridge, and whether the external member C2/A300 needs to be filled with ink may be determined according to ender users, and finally, the remanufactured ink cartridge C/A100 and may be used with the target ink cartridge interchangeably, thereby achieving the purpose of sufficient usage of the empty housings of the existing low-capacity ink cartridge on the market.

What is claimed is:

1. A remanufactured ink cartridge, comprising:
- a case configured to store ink;
- an ink discharge opening arranged at the case and configured to supply the ink to outside; and
- an external body fluid-communicating with the case,
- wherein:
  - the case is remanufactured through a low-capacity ink cartridge; and
  - a capacity of the low-capacity ink cartridge is lower than a capacity of the remanufactured ink cartridge.

2. The remanufactured ink cartridge according to claim 1, further comprising:
- an engagement part connected to the case and configured to fix the low-capacity ink cartridge in a first type inkjet printer; and
- a heightening part arranged at the engagement part and configured to fix the remanufactured ink cartridge in a second type inkjet printer.

3. The remanufactured ink cartridge according to claim 2, wherein:
- the engagement part is disposed with an engagement surface for combining with a corresponding part of the first type inkjet printer; and
- a position of the engagement surface opposite to the ink discharge opening is lower than a position of an upper surface of the heightening part opposite to the ink discharge opening.

4. The remanufactured ink cartridge according to claim 3, wherein:
- the heightening part is arranged at the engagement surface.

5. The remanufactured ink cartridge according to claim 2, wherein:
- the engagement part includes a base part connected to the case and an extension part extending from the base part; and
- the heightening part is positioned at the extension part.

6. The remanufactured ink cartridge according to claim 2, wherein the heightening part is an accessory installed at the engagement part.

7. The remanufactured ink cartridge according to claim 2, wherein at least a part of the heightening part moves as the engagement part deforms elastically.

8. The remanufactured ink cartridge according to claim 1, wherein:
- the case includes a cavity for storing the ink;
- the cavity is divided into a first cavity and a second cavity that communicate with each other through a channel;
- the ink discharge opening directly communicates with the first cavity; and
- the remanufactured ink cartridge further comprises a blocking part for blocking the channel.

9. The remanufactured ink cartridge according to claim 8, wherein:
- the remanufactured ink cartridge is detachably installed in an inkjet printer with an ink-suctioning needle and a limiting protrusion;
- the ink-suctioning needle is adjacent to the limiting protrusion and configured to be combined with the ink discharge opening; and
- the remanufactured ink cartridge further comprises a limiting groove facing the second cavity and including an opening, the limiting protrusion entering the limiting groove through the opening.

10. The remanufactured ink cartridge according to claim 8, wherein:
- the blocking part is formed through a deformation of a part of the case or is a plugging part or a filler arranged in the channel.

11. The remanufactured ink cartridge according to claim 8, wherein the blocking part is glue.

12. The remanufactured ink cartridge according to claim 1, wherein the case communicates with the external body through a single hole, and the external body also includes an inlet configured to allow external air into the external body.

13. The remanufactured ink cartridge according to claim 12, wherein the inlet is arranged at a position away from the ink discharge opening.

14. The remanufactured ink cartridge according to claim 1, further comprising:
- an engagement part connected to the external body and configured to fix the remanufactured ink cartridge in an inkjet printer.

15. A method for remanufacturing a target ink cartridge to obtain a remanufactured ink cartridge, the target ink cartridge including a case configured to store ink and an ink discharge opening arranged at the case and configured to supply the ink to outside, and the method comprising:
- remanufacturing the case to obtain a remanufactured case; and
- connecting an external body to the remanufactured case to form a fluid communication between the external body and the remanufactured case to obtain the remanufactured ink cartridge, wherein
- the target ink cartridge is a low-capacity ink cartridge; and
- a capacity of the low-capacity ink cartridge is lower than a capacity of the remanufactured ink cartridge.

16. The remanufacturing method according to claim 15, wherein:
- the target ink cartridge also includes an engagement part connected to the case; and
- the method further comprises:
  - arranging a heightening part at the case or the engagement part, the engagement part being configured to fix the target ink cartridge in a first type inkjet printer, and the heightening part being configured to fix the remanufactured ink cartridge in a second type inkjet printer.

17. The remanufacturing method according to claim 16, wherein:

the target ink cartridge is positioned in the first type inkjet printer through an engagement surface of the engagement part; and the heightening part is installed at the engagement surface.

18. The remanufacturing method according to claim 16, wherein:

the engagement part includes a base part connected to the case and an extension part extending from the base part;

a protrusion part is formed by extending from the base part beyond a part of the extension part along a front-rear direction; and the method further comprising:

cutting the protrusion part before installing the heightening part.

19. The remanufacturing method according to claim 15, wherein:

both the target ink cartridge and the external body include an inlet configured to exchange air with outside; and the method further comprises:

sealing the inlet of the target ink cartridge.

* * * * *